US007371325B2

(12) United States Patent
Kane

(10) Patent No.: US 7,371,325 B2
(45) **Date of Patent: *May 13, 2008**

(54) WELL FOR PROCESSING A FLUID

(75) Inventor: Jeffrey Kane, Manchester, MI (US)

(73) Assignee: Pall Corporation, East Hills, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 11/550,021

(22) Filed: Oct. 17, 2006

(65) Prior Publication Data

US 2007/0059218 A1 Mar. 15, 2007

Related U.S. Application Data

(63) Continuation of application No. 10/478,050, filed as application No. PCT/US02/16686 on May 29, 2002, now Pat. No. 7,135,117.

(60) Provisional application No. 60/294,211, filed on May 31, 2001.

(51) Int. Cl.

*B01B 61/00* (2006.01)
*B01D 63/00* (2006.01)
*B01D 37/00* (2006.01)
*B01D 11/00* (2006.01)
*B01D 24/00* (2006.01)

(52) U.S. Cl. ................. 210/650; 210/321.75; 210/767; 210/321.6; 210/232; 422/101; 422/99

(58) Field of Classification Search ........... 210/321.75, 210/650, 321.6, 767, 432, 232, 508; 422/101, 422/99

See application file for complete search history.

(56) References Cited

U.S. PATENT DOCUMENTS

| | | | |
|---|---|---|---|
| 3,663,374 | A | 5/1972 | Moyer et al. |
| 4,014,653 | A | 3/1977 | Gianos et al. |
| 4,127,131 | A | 11/1978 | Vaillancourt |
| 4,162,979 | A | 7/1979 | Wahlefeld et al. |
| 4,167,875 | A | 9/1979 | Meakin |
| 4,170,056 | A | 10/1979 | Meyst et al. |
| 4,301,010 | A | 11/1981 | Eddleman et al. |
| 4,472,276 | A | 9/1984 | Taylor |
| 4,623,461 | A | 11/1986 | Hossom et al. |
| 4,699,013 | A | 10/1987 | Kroner |
| 4,734,262 | A | 3/1988 | Bagshawe |
| 4,787,988 | A | 11/1988 | Bertoncini et al. |

(Continued)

FOREIGN PATENT DOCUMENTS

| | | |
|---|---|---|
| DE | 30 16 490 | 11/1981 |

(Continued)

OTHER PUBLICATIONS

International Preliminary Examination Report from International Application No. PCT/US02/16686 filed May 29, 2002.

*Primary Examiner*—Ana Fortuna
(74) *Attorney, Agent, or Firm*—Leydig, Voit & Mayer, Ltd.

(57) ABSTRACT

A well (50) comprising a side wall (10), a sealing ring (40), a rib arrangement (5), and a filter (20), for use in processing a fluid, e.g., by microtitration or microfiltration, is disclosed.

23 Claims, 18 Drawing Sheets

U.S. PATENT DOCUMENTS

| | | | |
|---|---|---|---|
| 4,797,259 | A | 1/1989 | Matkovich et al. |
| 4,800,020 | A | 1/1989 | Savas et al. |
| 4,828,801 | A | 5/1989 | Lombardy wife Alric et al. |
| 4,832,850 | A | 5/1989 | Cais et al. |
| 4,895,706 | A | 1/1990 | Root et al. |
| 4,902,481 | A | 2/1990 | Clark et al. |
| 4,948,422 | A | 8/1990 | Yoshizawa et al. |
| 4,948,442 | A | 8/1990 | Manns |
| 4,948,561 | A | 8/1990 | Hinckley et al. |
| 4,948,564 | A | 8/1990 | Root et al. |
| 5,047,215 | A | 9/1991 | Manns |
| 5,096,575 | A | 3/1992 | Cosack |
| 5,108,704 | A | 4/1992 | Bowers et al. |
| 5,116,496 | A | 5/1992 | Scott |
| 5,120,504 | A | 6/1992 | Petro-Roy et al. |
| 5,124,041 | A | 6/1992 | Sheer et al. |
| 5,137,804 | A | 8/1992 | Greene et al. |
| 5,208,161 | A | 5/1993 | Saunders et al. |
| 5,264,184 | A | 11/1993 | Aysta et al. |
| 5,334,538 | A | 8/1994 | Parker et al. |
| 5,423,989 | A | 6/1995 | Allen et al. |
| 5,464,541 | A | 11/1995 | Aysta et al. |
| 5,516,490 | A | 5/1996 | Sanadi |
| 5,620,663 | A | 4/1997 | Aysta et al. |
| 5,679,310 | A | 10/1997 | Manns |
| 5,710,049 | A | 1/1998 | Noppe et al. |
| 5,733,449 | A | 3/1998 | Bowers et al. |
| 5,846,745 | A | 12/1998 | Christensen et al. |
| 5,861,094 | A | 1/1999 | Goehde |
| 5,918,273 | A | 6/1999 | Horn |
| 6,083,760 | A | 7/2000 | Ditlow et al. |
| 6,159,368 | A | 12/2000 | Moring et al. |
| 6,358,730 | B1 | 3/2002 | Kane |
| 6,419,827 | B1 | 7/2002 | Sandell et al. |
| 6,782,354 | B1 | 8/2004 | Ikegami |
| 6,805,840 | B1 | 10/2004 | Tajima |
| 6,830,732 | B1 | 12/2004 | Hoffman et al. |
| 6,896,849 | B2 | 5/2005 | Reed et al. |
| 6,913,152 | B2 | 7/2005 | Zuk, Jr. |
| 7,063,216 | B2 * | 6/2006 | Lane et al. ................. 210/466 |

FOREIGN PATENT DOCUMENTS

| | | |
|---|---|---|
| DE | 41 14611 | 11/1991 |
| EP | 359 249 | 3/1990 |
| EP | 403 679 | 12/1990 |
| EP | 1 110 611 | 6/2001 |
| GB | 2 096 087 | 11/1981 |
| NL | 7811021 | 5/1979 |
| WO | WO 88/06723 | 9/1988 |
| WO | WO 90/14161 | 11/1990 |

* cited by examiner

WELL FOR PROCESSING A FLUID

CROSS-REFERENCE TO RELATED PATENT APPLICATIONS

This patent application is a continuation of U.S. patent application Ser. No. 10/478,050, filed Nov. 18, 2003, which was the National Stage of International Application No. PCT/US2002/016686, filed May 29, 2002, which claims the benefit of U.S. Provisional Patent Application No. 60/294,211, filed May 31, 2001.

FIELD OF THE INVENTION

This invention relates to wells for use in processing fluids, e.g., by titration and/or filtration, and more preferably relates to multiwell microtitration and microfiltration devices.

BACKGROUND OF THE INVENTION

Multiple well test devices are used in a variety of microtitration and/or microfiltration protocols. Typically, the devices have a standard number of wells, e.g., 96 wells, or 384 wells (arranged in four blocks of 96 wells each), and the wells include a filter arranged such that application of a vacuum or air pressure to one side of the device causes the fluid in each well to pass through the filter.

When the device is used in for microtitration, e.g., for an immunoassay or a hybridization assay, the filter is generally used to support one or more components of the assay, such as an antigen, antibody, nucleic acid probe or nucleic acid sample. A supported component (e.g., a specific binding agent) binds to an unsupported component in a fluid sample. At least one component can be contained in, on, and/or through the filter, e.g., by physical entrapment, chemical binding and/or adsorption.

When used for microfiltration the filter is generally used to remove one or more components from solutions passed through it, e.g., on the basis of physical, biological and/or chemical interactions in or on the filter. The interactions can be, for example, between the filter and the component to be retained, or between one or more materials retained in or on the filter and the component to be retained.

Accordingly, the devices can be utilized to remove one or more undesirable and/or desirable materials from a fluid. For example, the devices can be used to remove particulates from a sample before further processing (e.g., analysis) of the sample and/or to retain a desired ligand for later recovery and further processing.

Some conventional devices are labor intensive to manufacture and/or are not adapted for use with a variety of filters. Additionally, the seal of the filter in the device can be adversely affected by handling and/or fluid processing conditions.

The present invention provides for ameliorating at least some of the disadvantages of the prior art. These and other advantages of the present invention will be apparent from the description as set forth below.

BRIEF SUMMARY OF THE INVENTION

In accordance with an embodiment of the invention, a well for processing fluid is provided, the well comprising a hollow tube comprising a side wall having an inner surface, a bottom end comprising a bottom wall and a fluid flow port, and a rib arrangement projecting upwardly from the bottom wall, the rib arrangement having a top surface spaced away from the inner surface of the side wall; a sealing ring having an outer surface and a bottom surface, the outer surface of the sealing ring pressing against the inner surface of the side wall; and a filter comprising at least one filter element, the filter having an upper surface and a lower surface, the filter being compressed between the bottom surface of the sealing ring and the top surface of the rib arrangement. Typically, the bottom surface of the sealing ring presses against the upper surface of the filter while the top surface of the rib arrangement presses against the lower surface of the filter. In a preferred embodiment of the well, the bottom surface of the sealing ring has a width that is at least the width of the top surface of the rib arrangement.

In accordance with another embodiment, a well for processing fluid is provided, the well comprising a hollow tube comprising a side wall having an inner surface and an inwardly extending lip having a lower surface; a bottom end comprising a bottom wall and a fluid flow port, and a sealing ring comprising a rib arrangement projecting upwardly from the bottom wall, the rib arrangement having a top surface; the sealing ring also comprising an outer surface, the outer surface of the sealing ring pressing against the inner surface of the side wall; and a filter comprising at least one filter element, the filter having an upper surface and a lower surface, the filter being compressed between the lower surface of the lip and the top surface of the rib arrangement. Typically, the top surface of the rib arrangement is spaced away from the inner surface of the side wall. Preferably, the lower surface of the lip has a width that is at least the width of the top surface of the rib arrangement.

A well for processing fluid according to another embodiment of the invention comprises a hollow tube comprising a side wall having an inner surface and an inwardly extending lip, the lip having a rib arrangement projecting downwardly from the lip, the rib arrangement having a bottom surface; a bottom end comprising a bottom wall and a fluid flow port and a sealing ring comprising an outer surface and a top surface, the outer surface of the sealing ring pressing against the inner surface of the side wall of the tube, and a filter comprising at least one filter element, the filter having an upper surface and a lower surface, the filter being compressed between the top surface of the sealing ring and the bottom surface of the rib arrangement.

In some embodiments of the well, the bottom end also includes a drainage grid comprising at least one drainage channel communicating with the fluid flow port. For example, the bottom end can include a drainage grid comprising a plurality of drainage grid spacers projecting upwardly from the bottom wall, wherein a plurality of drainage channels are provided between the drainage grid spacers, and the drainage channels communicate with the fluid flow port.

In accordance with another embodiment, a plurality of the wells are connected together to provide a multiple well device, e.g., in the form of a 96 or 384 well device, in some embodiments, a 96 or 384 well tray.

Methods are also provided for processing a fluid utilizing embodiments of the well and the multiple well devices. Suitable methods include, for example, microtitration, microfiltration, and microculture procedures.

BRIEF DESCRIPTION OF THE DRAWINGS

FIG. 4 shows an embodiment of a sealing ring.

FIG. 5 shows partial cut away views of a portion of a well according to an embodiment of the invention, showing a sealing ring, a filter, a rib arrangement, and a drainage grid.

FIG. 10 shows partial cross-sectional views of the plates shown in FIG. 6.

DETAILED DESCRIPTION OF THE INVENTION

Figure 1:
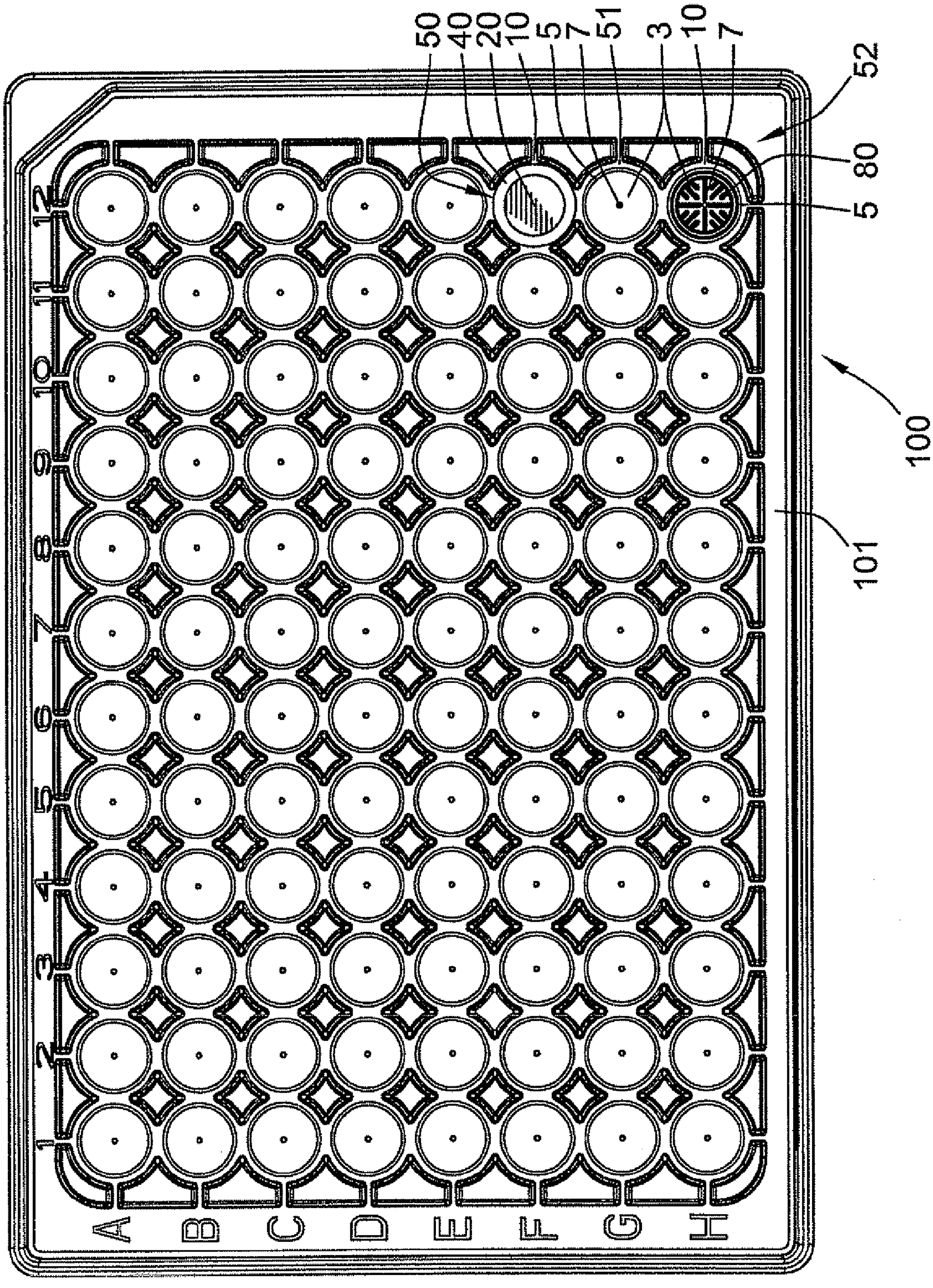
FIG. 1 shows a top view of an embodiment of a base suitable for use in a multiple well device according to the present invention, showing a first well including filter and a sealing ring, a second well including a rib arrangement and fluid flow port, and a third well including a rib arrangement, a drainage grid, and a fluid flow port.

In one embodiment of the present invention, a well for use in processing a fluid comprises a hollow tube having an axis, the tube comprising a side wall having an inner surface; upper and lower axially spaced ends, the lower end comprising a bottom wall and a fluid flow port, and a rib arrangement projecting upwardly from the bottom wall, the rib arrangement having a top surface spaced from the inner surface of the side wall; a sealing ring having an outer surface and a bottom surface, the outer surface of the sealing ring pressing against the inner surface of the side wall; and a filter comprising at least one filter element, the filter having a upper surface and a lower surface, the filter being compressed between the bottom surface of the sealing ring and the top surface of the rib arrangement. Preferably, the bottom surface of the sealing ring has a radial width that is at least the radial width of the top surface of the rib arrangement. Typically, the sealing ring seals the filter against the rib arrangement wherein the bottom surface of the sealing ring presses against the upper surface of the filter while the top surface of the rib arrangement presses against the lower surface of the filter. In some embodiments, the sealing ring has a hollow bore suitable for receiving fluid, wherein the bore substantially extends to the upper end of the tube.

A well for use in processing a fluid according to another embodiment of the invention comprises a hollow tube having an axis, the tube comprising a side wall having an inner surface; upper and lower axially spaced ends, the lower end comprising a bottom wall, a fluid flow port, a drainage grid arrangement comprising at least one drainage grid spacer projecting upwardly from the bottom wall, and a rib arrangement projecting upwardly from the bottom wall, the rib arrangement having a top surface spaced from the inner surface of the side wall of the tube; a filter comprising at least one filter element, the filter having an upper surface and a lower surface; and a sealing ring sealing the filter against the rib arrangement, the sealing ring having an outer surface, and a bottom surface, the bottom surface having a radial width that is at least the radial width of the top surface of the rib arrangement, the outer surface of the sealing ring pressing against the inner surface of the side wall of the tube, and the bottom surface of the ring pressing against the upper surface of the filter while the top surface of the rib arrangement presses against the lower surface of the filter.

In yet another embodiment of the present invention, a well for use in processing a fluid comprises a hollow tube having an axis, the tube comprising a side wall having an inner surface and a lip extending inwardly from the side wall, the lip having a lower surface; upper and lower axially spaced ends, the lower end comprising a bottom wall and a fluid flow port, and a sealing ring comprising a rib arrangement projecting upwardly from the bottom wall, the rib arrangement having a top surface; the sealing ring comprising an outer surface and the top surface of the rib arrangement, the outer surface of the sealing ring pressing against the inner surface of the side wall; and a filter comprising at least one filter element, the filter having a upper surface and a lower surface, the filter being compressed between the lower surface of the lip and the top surface of the rib arrangement. Typically, the top surface of the rib arrangement is spaced from the inner surface of the side wall. Preferably, the top surface of the rib arrangement has a radial width that is at least the radial width of the lower surface of the lip. Typically, the sealing ring seals the filter against the rib arrangement wherein the top surface of the sealing ring presses against the lower surface of the filter while the lower surface of the lip presses against the upper surface of the filter.

A well for use in processing a fluid according to another embodiment of the invention comprises a hollow tube having an axis, the tube comprising a side wall having an inner surface and a lip extending inwardly from said side wall, the lip having a lower surface; upper and lower axially spaced ends, the lower end comprising a bottom wall and a fluid flow port and a sealing ring comprising an outer surface and a top surface, the outer surface of the sealing ring pressing against the inner surface of the side wall of the tube; a filter comprising at least one filter element, the filter having an upper surface and a lower surface, the filter being compressed between the top surface of the sealing ring and the lower surface of the lip. In a preferred embodiment, the lip comprises a rib arrangement projecting downwardly from the lip, more preferably, wherein the rib arrangement has a bottom surface spaced from the inner surface of the side wall, and the filter is compressed between the top surface of the sealing ring and the bottom surface of the rib arrangement. In another embodiment, the sealing ring further comprises a rib arrangement projecting upwardly from the bottom wall, the rib arrangement having a top surface, wherein the filter is compressed between the top surface of the rib arrangement and the lower surface of the lip. The top surface of the rib arrangement can be spaced from the inner surface of the side wall.

In accordance with another embodiment, a microtitration or microfiltration device is provided comprising a well comprising a hollow tube having an axis, the tube comprising a side wall having an inner surface, upper and lower axially spaced ends, the lower end comprising a bottom wall, a drainage grid comprising at least one drainage channel, and a fluid flow port, and a rib arrangement projecting upwardly from the bottom wall, the rib arrangement having a top surface that does not contact the inner surface of the side wall of the tube, a filter comprising at least one filter element, the filter having an upper surface and a lower surface, and a sealing ring sealing the filter against the rib arrangement, the sealing ring having an outer surface, and a bottom surface, the bottom surface having a width that is at least the width of the top surface of the rib arrangement, the outer surface of the sealing ring pressing against the inner surface of the side wall of the tube, and the bottom surface of the ring pressing against the upper surface of the filter while the top surface of the rib arrangement presses against the lower surface of the filter.

In accordance with another embodiment, a device for culturing a cell suspension or tissue comprises a well for receiving a cell suspension or tissue, the well having a side wall having an inner surface, a bottom end comprising a bottom wall and a fluid flow port, and a rib arrangement projecting upwardly from the bottom wall, the rib arrangement having a top surface that does not contact the inner surface of the side wall; a filter sealed in the well, the filter comprising at least one filter element suitable for culturing the cell suspension or tissue, the filter having a upper surface and a lower surface; and a sealing ring sealing the filter against the rib arrangement, the sealing ring having an outer surface, and a bottom surface, the bottom surface having a width that is at least the width of the top surface of the rib arrangement, the sealing ring pressing against the inner surface of the side wall, and the bottom surface of the ring pressing against the upper surface of the filter while the top surface of the rib arrangement presses against the lower surface of the filter. Typically, device further comprises a culture medium contained in the well.

In more preferred embodiments of the invention, a plurality of wells are connected together to provide a multiple well device. In accordance with embodiments of the invention, the potential for cross-contamination from one well to another can be eliminated.

An embodiment of a multiple well device according to the invention comprises a plurality of wells for receiving liquid samples to be processed, each well having a side wall having an inner surface, a bottom end comprising a bottom wall and a fluid flow port, and a rib arrangement projecting upwardly from the bottom wall, the rib arrangement having a top surface spaced from the inner surface of the side wall; a sealing ring having an outer surface, and a bottom surface, the outer surface of the sealing ring pressing against the inner surface of the side wall of the tube; and a filter comprising at least one filter element, the filter having a upper surface and a lower surface, the filter being compressed between the bottom surface of the sealing ring and the top surface of the rib arrangements.

In another embodiment, a multiple well device comprises a plurality of wells for receiving liquid samples to be processed, each well comprising a side wall having an inner surface, a bottom end comprising a bottom wall and a fluid flow port, and a rib arrangement projecting upwardly from the bottom wall, the rib arrangement having a top surface that does not contact the inner surface of the side wall; a filter comprising at least one filter element, the filter having a upper surface and a lower surface; and a sealing ring sealing the filter against the rib arrangement, the sealing ring having an outer surface and a bottom surface, the bottom surface having a width that is at least the width of the top surface of the rib arrangement, the outer surface of the sealing ring pressing against the inner surface of the side wall, and the bottom surface of the ring pressing against the upper surface of the filter while the top surface of the rib arrangement presses against the lower surface of the filter.

In some embodiments of multiple well devices according to the invention, the device comprises at least a top plate and a bottom plate, wherein the top plate comprises the sealing ring, and the bottom plate comprises the bottom wall and the rib arrangement. In one embodiment wherein the top plate comprises the sealing ring, the sealing ring has a hollow bore that substantially extends to the top surface of the plate.

In accordance with another embodiment, a multiple well device comprises a plurality of wells for receiving liquid samples to be processed, each well comprising a side wall having an inner surface and a lip extending inwardly from the side wall, the lip having a lower surface; a bottom end comprising a bottom wall and a fluid flow port and sealing ring comprising a rib arrangement projecting upwardly from the bottom wall, the rib arrangement having a top surface that does not contact the inner surface of the side wall, the sealing ring comprising an outer surface; and a filter comprising at least one filter element, the filter having a upper surface and a lower surface; the outer surface of the sealing ring pressing against the inner surface of the side wall; and the lower surface of the lip pressing against the upper surface of the filter while the top surface of the rib arrangement presses against the lower surface of the filter.

In accordance with an embodiment of the invention, a multiple well device comprises a plurality of wells for receiving liquid samples to be processed, each well comprising a side wall having an inner surface and a lip extending inwardly from the side wall, the lip having a rib arrangement projecting downwardly from the lip, the rib arrangement having a bottom surface that does not contact the inner surface of the side wall; a bottom end comprising a bottom wall and a fluid flow port and a sealing ring comprising an outer surface and a top surface, wherein the bottom wall of the bottom end comprises the top surface of the sealing ring; and a filter comprising at least one filter element, the filter having a upper surface and a lower surface; the outer surface of the sealing ring pressing against the inner surface of the side wall; and the top surface of the sealing ring pressing against the lower surface of the filter while the bottom surface of the rib arrangement presses against the upper surface of the filter.

Another embodiment of a multiple well device according to the invention comprises a top plate comprising the upper ends of a plurality of wells; a plurality of separate inserts comprising the lower ends of the plurality of wells, each insert comprising a bottom wall and a fluid flow port; and a plurality of filters, each filter comprising at least one filter element, wherein each filter is sealed between the top plate and an insert. In some embodiments, the top plate includes a plurality of sealing rings, and in some other embodiments, each insert comprises a sealing ring.

Yet another embodiment of a multiple well device according to the invention comprises a bottom plate comprising the bottom ends of a plurality of wells, each bottom end comprising a bottom wall and a fluid flow port; a plurality of separate inserts comprising the upper ends of the plurality of wells; and a plurality of filters, each filter comprising at least one filter element, wherein each filter is sealed between the top plate and an insert. In some embodiments, the bottom plate includes a plurality of sealing rings, and in some other embodiments, each insert comprises a sealing ring.

Embodiments of multiple well devices include wells connected together in the form of, for example, a strip, disc, or tray. Multiple well devices can include integrally formed wells (e.g., formed by injection or blow molding), or the wells can be formed from a plurality of components, e.g., an upper plate, tray or insert defining the upper portion of the wells and/or the sealing ring, and a bottom plate, tray or insert defining at least the bottom wall of the wells.

The wells, and more preferably, the multiple well devices, are suitable for use with a variety of other components such as a chamber, plenum, manifold, manifold cover, or the like, e.g., for applying reduced pressure or vacuum to the wells. Accordingly, some embodiments of the wells and multiple well devices further comprise, for example, a manifold cover.

Embodiments of methods for using the wells and multiple well devices are also provided.

For example, one embodiment of a method for processing a fluid comprises passing a fluid into a well comprising a side wall having an inner surface, and a bottom end having a rib arrangement having a top surface, wherein the top surface of the rib arrangement is spaced from the inner surface of the side wall, and a fluid flow port; the well having a filter comprising at least one filter element sealed therein, the filter being compressed between a lower surface of a sealing ring, and the top surface of the rib arrangement, and, passing at least a portion of the fluid through the filter and through the fluid flow port at the bottom end of the well.

In another embodiment, a method for processing a fluid comprises passing a fluid into a device comprising a well comprising a side wall having an inner surface, and a lip extending inwardly from said side wall, the lip having a lower surface; and lower end comprising a bottom wall and a fluid flow port and a sealing ring, the sealing ring comprising a top surface; the well having a filter comprising at least one filter element sealed therein, the filter being compressed between a lower surface of the lip, and the top surface of the sealing ring, and, passing at least a portion of the fluid through the filter and through the fluid flow port at the bottom end of the well.

Preferably, the method comprises processing fluid in a multiple well device, wherein fluid is passed into a plurality of wells as described above.

Embodiments of the method can include binding at least one component in the fluid to be processed to at least one binding agent in the well, in some embodiments, binding at least one component in the fluid to be processed to at least one binding agent in or on the filter. For example, embodiments of the method can include antigen-antibody binding, binding a nucleic acid in a sample to a complementary nucleic acid probe, binding ligands, and binding proteins. In some embodiments, at least one binding agent is a specific binding agent such as a monoclonal antibody or a nucleic acid probe that specifically binds to a component in the fluid to be processed. Other embodiments of the method include, for example, removing particulates from the fluid to be processed, and synthesizing desired materials in the wells. If desired, embodiments of the method also include analyzing the filtrate passing through the filter and/or analyzing the bound component (in some embodiments, after cleaving the bound component from the well).

Each of the components of the invention will now be described in more detail below, wherein like components have like reference numbers.

FIG. 1 shows a top view of a multiple well device 100 according to an embodiment of the invention, comprising a base or bottom plate 101 suitable for providing the bottom ends for a plurality of wells. FIG. 1 also shows an assembled well 50 according to an embodiment of the invention, as well as two non-assembled wells 51 and 52. Assembled well 50 comprises a side wall 10, a sealing ring 40, and a filter 20. While not shown in assembled well 50, the two non-assembled wells 51 and 52 show a bottom end 3, comprising a rib arrangement 5 and a fluid flow port 7 (all covered by filter 20 in the assembled well 50), and a side wall 10. Non-assembled well 52 also shows a drainage grid 80, as well as the rib arrangement 5.

Figure 2:
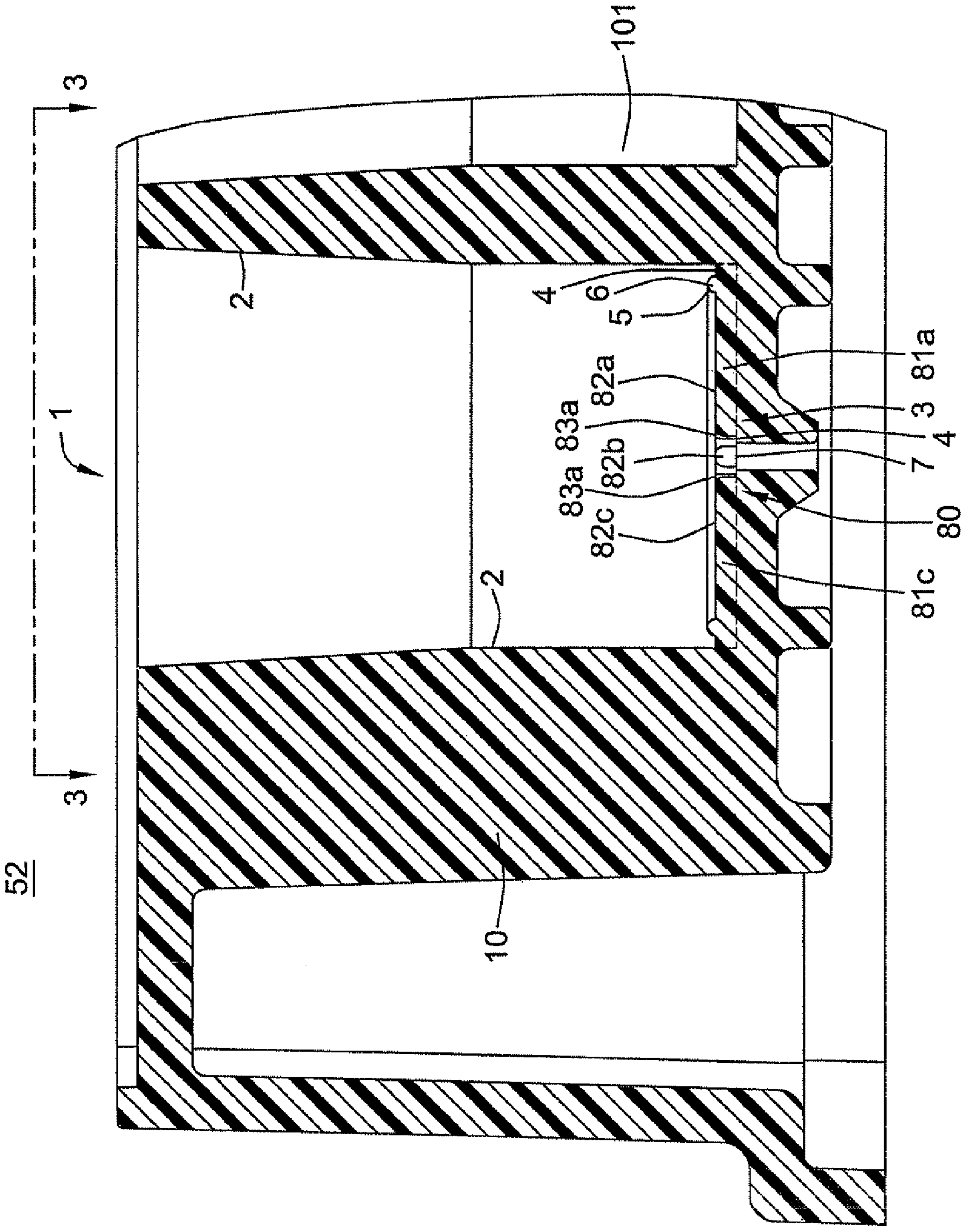
FIG. 2 shows a partial cross-sectional view of a portion of the base including the third well shown in FIG. 1, showing the inner surface of the side wall of the well, the bottom wall of the well, as well as the rib arrangement and the drainage grid projecting upwardly from the bottom wall.

FIG. 2 shows a partial cross-sectional view of a portion of the bottom plate 101 including the non-assembled well 52 shown in FIG. 1, showing the side wall 10 having an inner surface 2, and the bottom end 3, comprising a bottom wall 4, a rib arrangement 5 projecting upwardly from the bottom wall, the rib arrangement having a top surface 6, a drainage grid 80, and a fluid flow port 7.

Figure 3:
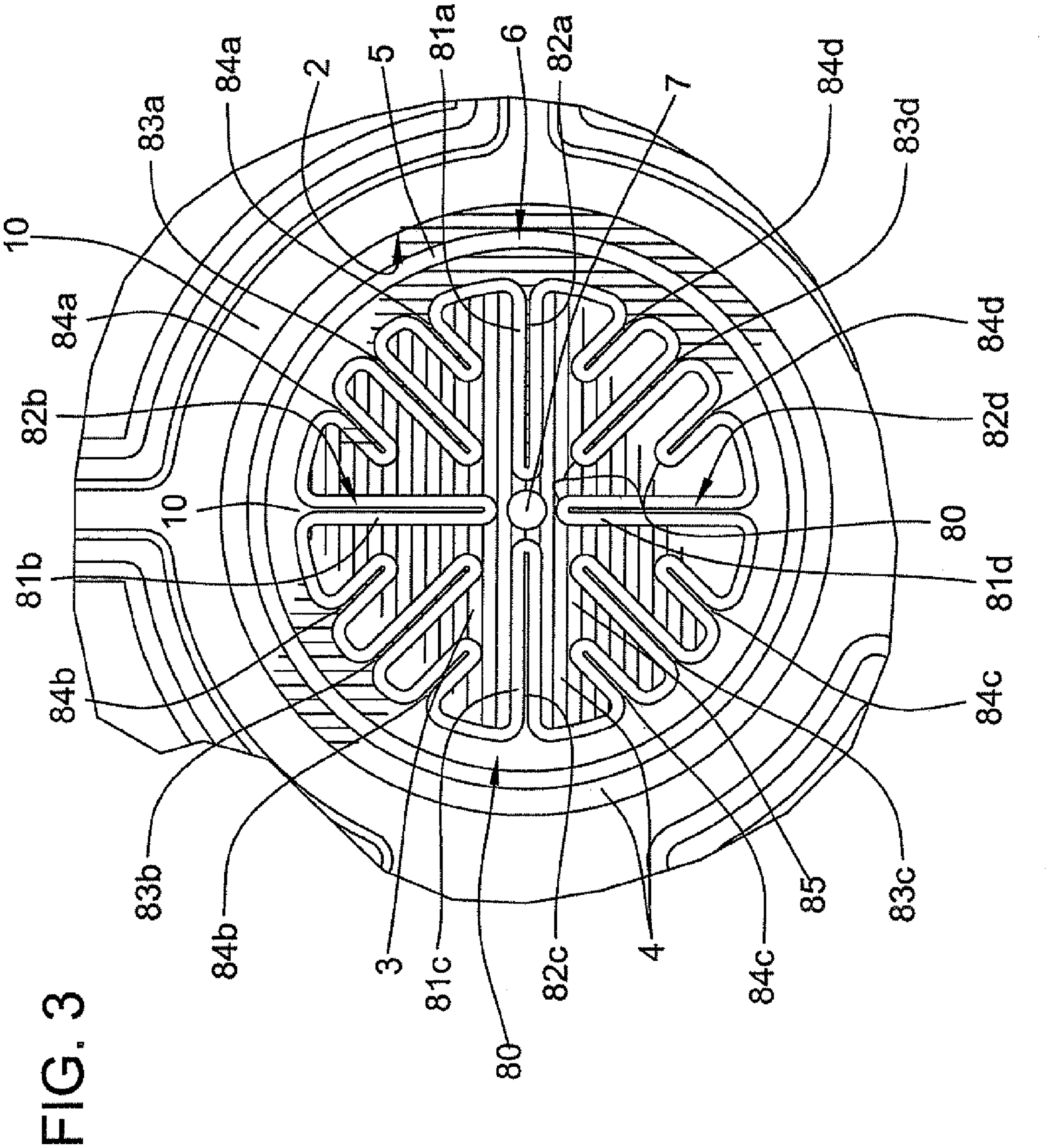
FIG. 3 shows an enlarged top view of the third well shown in FIG. 1, the well including the rib arrangement, the drainage grid, and the fluid flow port.

FIG. 3 shows a top view of the non-assembled well 52 shown in FIG. 2, showing the side wall 10 having an inner surface 2, and the bottom end 3, comprising a bottom wall 4, a rib arrangement 5 having a top surface 6, a drainage grid 80, and a fluid flow port 7.

Figure 4A:
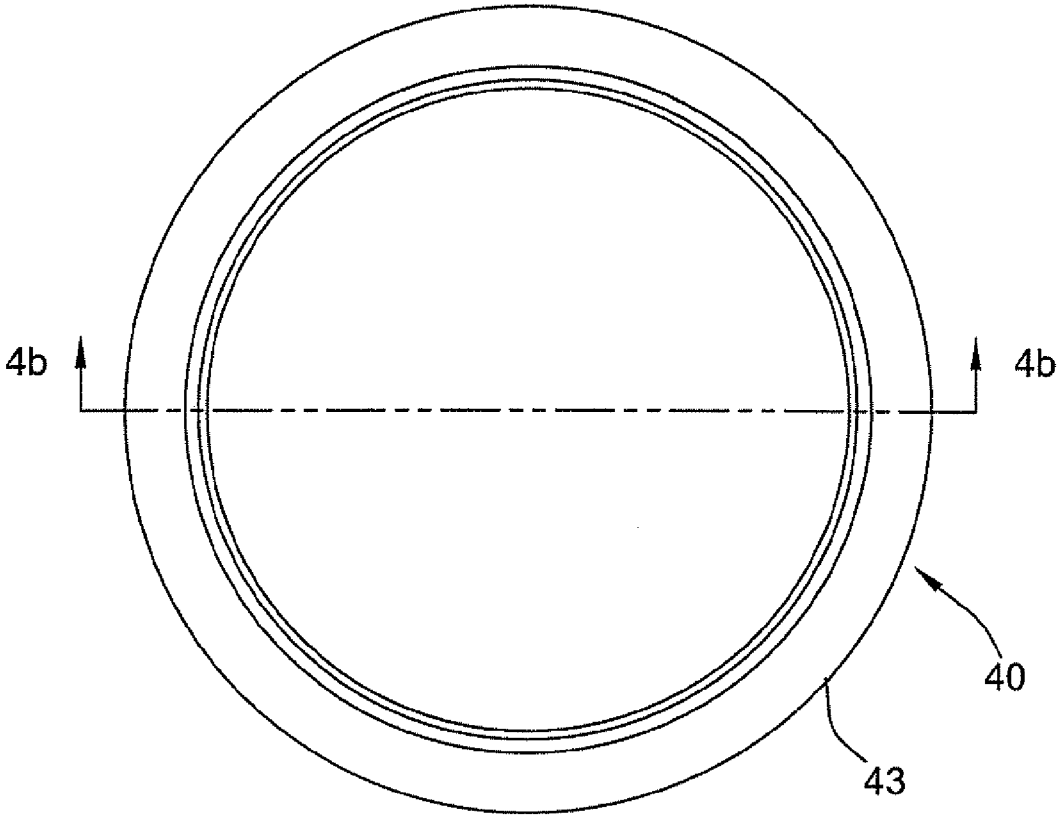
FIG. 4*a* shows a top view.
Figure 4B:
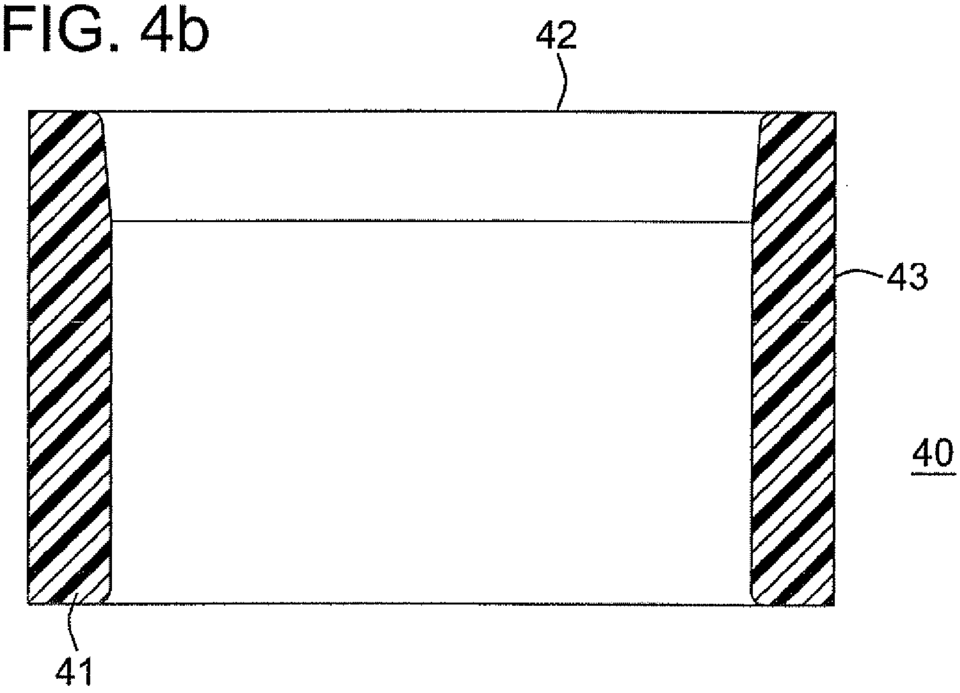
FIG. 4*b* shows a cross-section view along lines 4*b*-4*b* in FIG. 4*a*.

FIG. 4 shows an embodiment of a sealing ring 40. FIG. 4*a* shows a top view of sealing ring 40 having an outer surface 43, and FIG. 4*b* shows a cross-section view along lines 4*b*-4*b* in FIG. 4*a*, showing the top surface 42, the bottom surface 41, and the outer surface 43 of sealing ring 40.

Figure 5A:
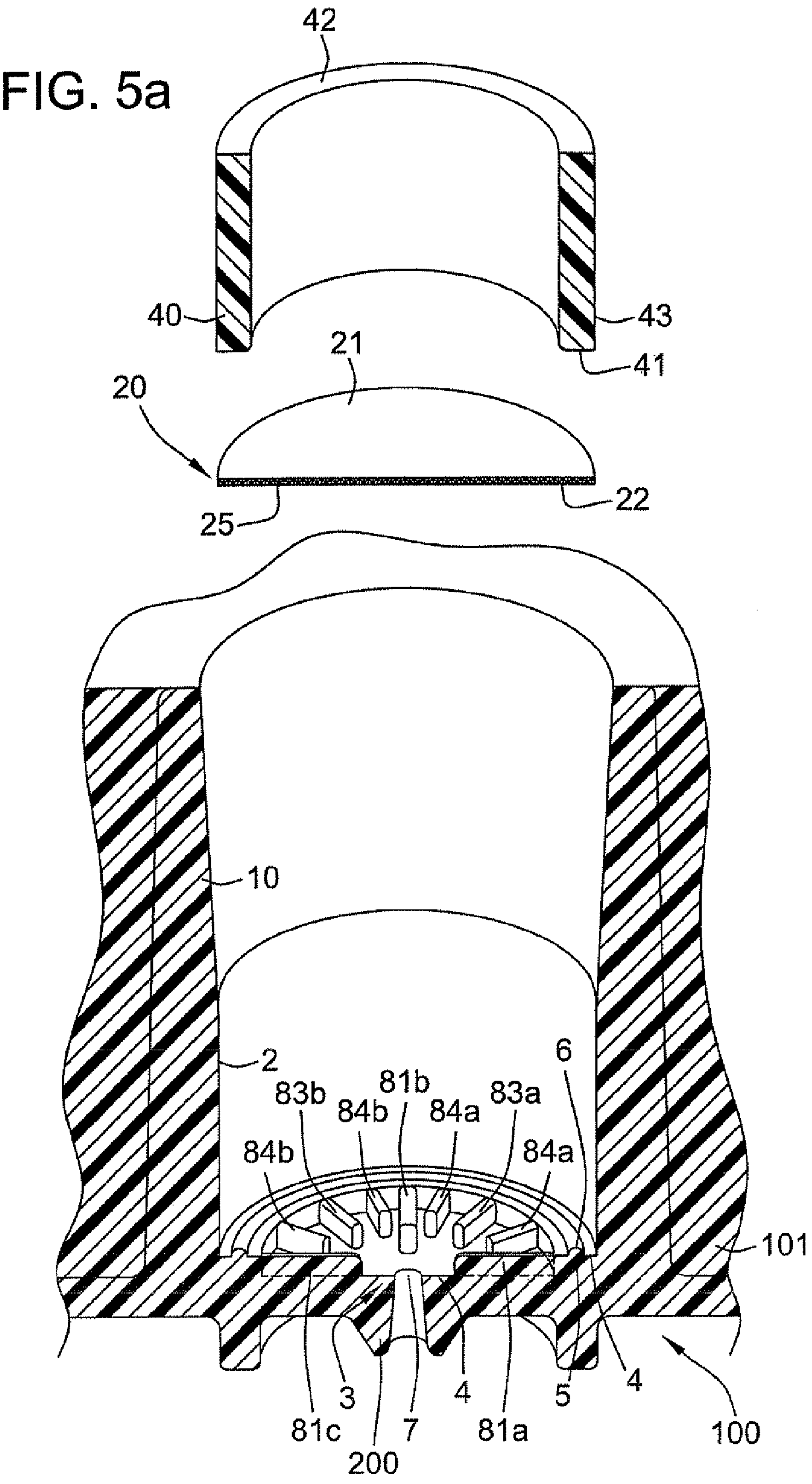
FIG. 5*a* shows an exploded view.
Figure 5B:
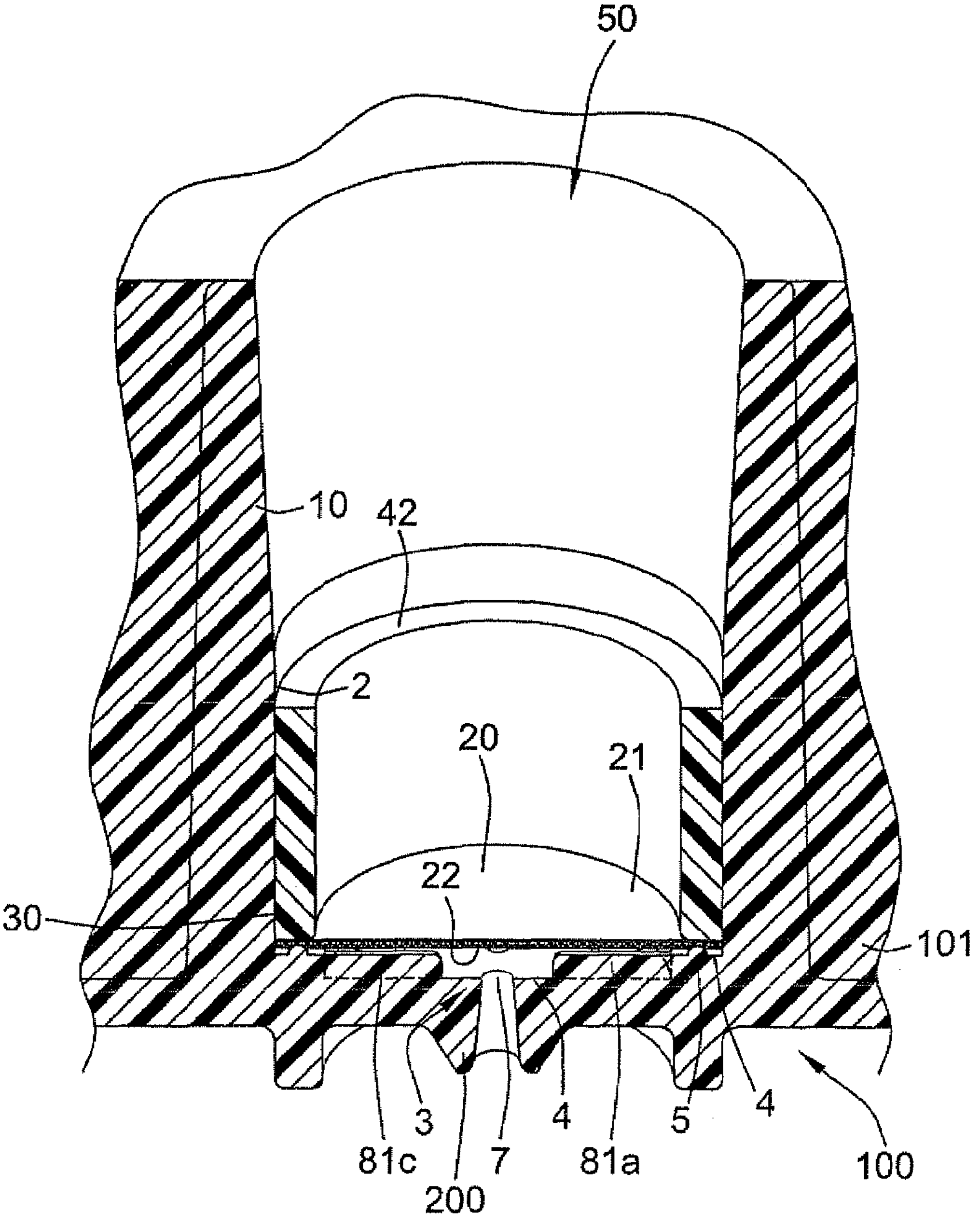
FIG. 5*b* shows an assembled view wherein the sealing ring is retained such that the outer surface of the sealing ring presses against the inner surface of the side wall of the well, and the bottom surface of the ring presses against the upper surface of the filter while the top surface of the rib arrangement presses against the lower surface of the filter so that the filter is sealed in the well.

The separate and/or partially assembled components shown in FIGS. 1-4 are shown arranged in FIGS. 5*a* (exploded view) and 5*b* (assembled view), that illustrate a partial cut away view of a device comprising a well according to an embodiment of the invention, Using FIGS. 5*a* and 5*b* for reference, the illustrated device 100 comprises a well 50 comprising a hollow tube, and a filter 20 having an upper surface 21 and a lower surface 22 (the filter comprising a filter element 25), interposed between a sealing ring 40 having a bottom surface 41, and a rib arrangement 5 having an top surface 6, wherein the lower surface 22 of the filter contacts the top surface 6 of the rib arrangement, and the upper surface 21 of the filter contacts the bottom surface 41 of the sealing ring. The hollow tube comprises a side wall 10 having an axis, the side wall 10 having an inner surface 2, the well having a top (or upper) end 1, and a bottom (or lower) end 3, wherein the ends are axially spaced, the bottom end 3 comprising a bottom wall 4 and a fluid flow port 7, and a rib arrangement 5 projecting upwardly from the bottom wall.

In the embodiment shown in FIG. 5*b*, the rib arrangement 5 has a raised portion such as a rib, ridge, or boss, and has a top surface 6 (that is preferably a non-planar surface, e.g., a rounded surface) disposed to contact the lower surface 22 of a filter 20 comprising at least one filter element 25. As will be described in more detail below (e.g., with reference to FIG. 16), in other embodiments of the rib arrangement, the arrangement has a surface disposed to contact the upper surface of a filter.

The top surface 6 of the rib arrangement illustrated in FIGS. 5*a* and 5*b* does not contact the inner surface 2 of the side wall of the well (the Figures show a depression between the top surface of the rib arrangement and the inner surface of the side wall), and the rib arrangement can be located a predetermined distance from the inner surface of the side wall. In this illustrated embodiment, a sealing ring 40 having a bottom surface 41, a top surface 42, and an outer surface 43, is retained against the inner surface of the hollow tubular wall, the outer surface 43 of the ring pressing against the inner surface 2 of the side wall (e.g., at location 30, that can be a predetermined position along the inner surface of the wall), and the lower surface 41 of the ring pressing against the upper surface 21 of the filter 20 while the top surface 6 of the rib arrangement 5 presses against the lower surface 22 of the filter. The sealing ring 40 efficiently seals the filter 20 in the well, typically by compressing the portion of the filter surface contacting the sealing ring lower surface 41 as the portion of the filter surface contacting top surface 6 is also compressed. Thus, fluid is prevented from bypassing the filter (i.e., passing around the edges of the filter rather than through the filter). Accordingly, fluid passes from the upper surface of the filter through the lower surface of the filter, and passes from the well through flow port 7.

Typically, the device, and more typically, the well, includes one or more additional components for more efficient fluid processing, e.g., to prevent masking or blocking of the filter. For example, using the illustrative embodiments shown in FIGS. 3, 8, 13, and 17 (described below) for reference, the bottom end can include a drainage grid comprising one or more spacers and/or channels arranged such that fluid passing through the filter passes along the drainage channels between the grid spacers and then through the fluid flow port.

In a preferred embodiment, the bottom end comprises a drainage grid comprising at least one, more preferably, at least two, and even more preferably, at least three, drainage grid spacers projecting upwardly from the bottom wall. Illustratively, as shown in FIG. 5*a* (cut away view), and shown in more detail in FIG. 3 (top view), the bottom end 3 comprises a drainage grid 80 comprising a drainage grid wall 85 (a portion of bottom wall 4), drainage grid spacers 81*a-d*, 83*a-d* and 84*a-d* projecting upwardly from bottom wall 4, and drainage channels between the grid spacers (the drainage grid wall 85 forming the bottom of the drainage channels), wherein the drainage channels communicate with fluid flow port 7. Drainage grid spacers 81*a-d*, 83*a-d*, and 84*a-d*, have top surfaces 82*a-d*, 86*a-d*, and 87*a-d*, respectively.

The drainage grid can have a variety of configurations so long as the filter can be supported and sufficient space is allowed for the passage of filtrate. For example, in one embodiment (not shown), the spacers and/or channels can have a radial and/or circular configuration. Additionally, or alternatively, the drainage grid wall, the drainage channels and/or the drainage grid spacers can have, for example, a configuration sloping toward the fluid flow port 7. Fluid flow port 7 can have a tapered configuration if desired.

In some embodiments, e.g., using the embodiment illustrated in FIG. 2 for reference, the top surfaces of the drainage grid spacers (e.g., top surfaces 82*a* and 82*c*, that can be planar or non-planar) are substantially coplanar with the bottom wall 4 between the rib arrangement 5 and the inner surface 2 of the tube. If desired, this portion of the bottom wall (between the rib arrangement and the inner surface of the tube) can be substantially coplanar with the surface of the drainage grid wall 85, and other configurations can also be suitable.

The tubular wall is preferably cylindrical, but in some embodiments includes multiple sides, e.g., multiple flat sides in order to provide a pentagonal, hexagonal, heptagon al, or octagon al shape, or a combination of flat and rounded portions.

While the tubular wall of the well can include a tapered section, e.g., a reduction in the inner diameter of the well along a portion of the length of the wall, the wall is preferably not tapered at the location where the sealing ring is retained against the inner surface of the side wall.

The sealing ring is preferably arranged to be frictionally engaged against the inner surface of the side wall. Since the tubular wall is preferably cylindrical, the sealing ring 40 preferably comprises a generally annular ring, the sealing ring having an axis, and an outer surface 43.

In the embodiment illustrated in FIGS. 4*b*, 5*a* and 5*b*, the sealing ring also comprises a bottom surface 41. More preferably, the bottom surface 41 has a width dimension radially of the ring that is generally the same as the radial width of the top surface 6 of the circumferential rib arrangement 5. Since the sealing ring 40 is preferably frictionally engaged against the inner wall of the well at position 30, the outer surface 43 of the sealing ring before insertion in the well has a diameter that is larger than the inner diameter of the wall of the well at position 30, e.g., the outer diameter of the sealing ring is compressed during insertion into the well. The ring, once inserted into the well, is retained against the inner surface of the wall with the bottom surface 41 of the ring pressing against the upper surface 21 of the filter 20, and pressing the peripheral portion of the lower surface 22 of the filter 20 against the top surface 6 of the rib arrangement 5. Accordingly, the filter can be efficiently secured and sealed in the well without utilizing welding and/or adhesives, e.g., to secure the sealing ring in the well.

In accordance with some preferred embodiments of the invention, e.g., as described with respect to FIG. 5*b* above, and with respect to FIG. 6 below, clamping and sealing forces can be concentrated on the portion of the filter contacting the bottom surface of the sealing ring and the portion of the filter contacting the top surface of the rib arrangement. Clamping and sealing forces can be concentrated with respect to the sealing ring and the rib arrangement in accordance with some other embodiments of the invention (e.g., with respect to FIGS. 11 and 16) as described in more detail below. In addition, since the sealing ring in accordance with each of these four embodiments is preferably retained at a location in the well wherein the wall of the well is not tapered, the preferred configuration provides an efficient seal, keeps the filter substantially flat, and provides for maintaining the seal during exposure to conditions (occurring, for example, during shipping and/or storage) that could cause conventional seals to "back out" of the wells, e.g., conditions such as vibration and changes in temperature.

Figure 12:
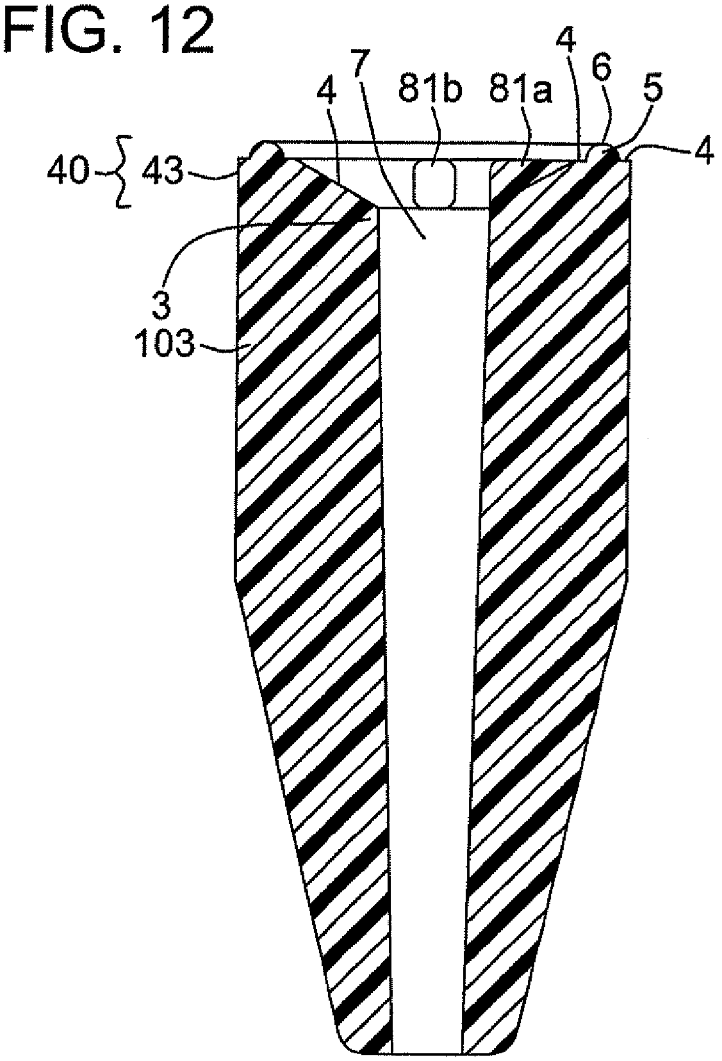
FIG. 12 shows a cut away view of the lower chamber of one of the wells shown in FIG. 11, showing the bottom end of the well, including a bottom wall, a fluid flow port, and a sealing ring comprising a rib arrangement projecting upwardly from the bottom wall.
Figure 13:
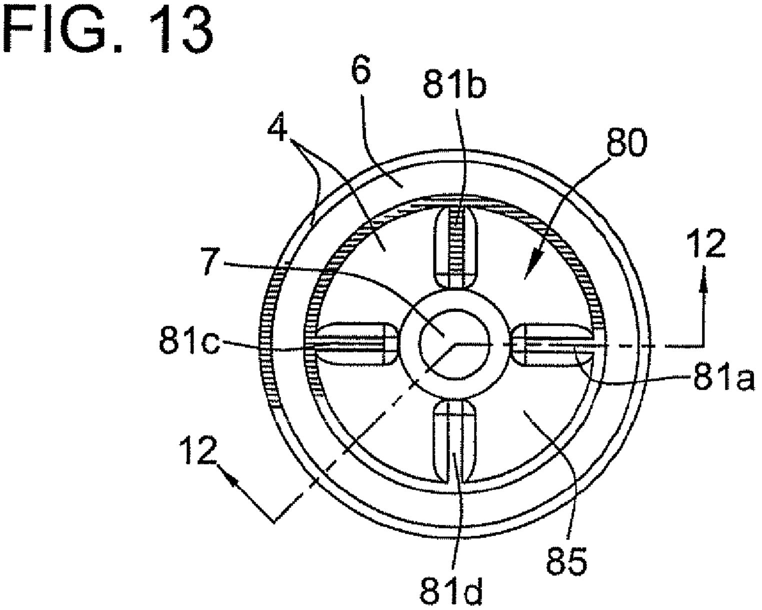
FIG. 13 shows a top view of the bottom end of the well shown in FIG. 11, showing a bottom wall, a rib arrangement, a drainage grid, and a fluid flow port.
Figure 18:
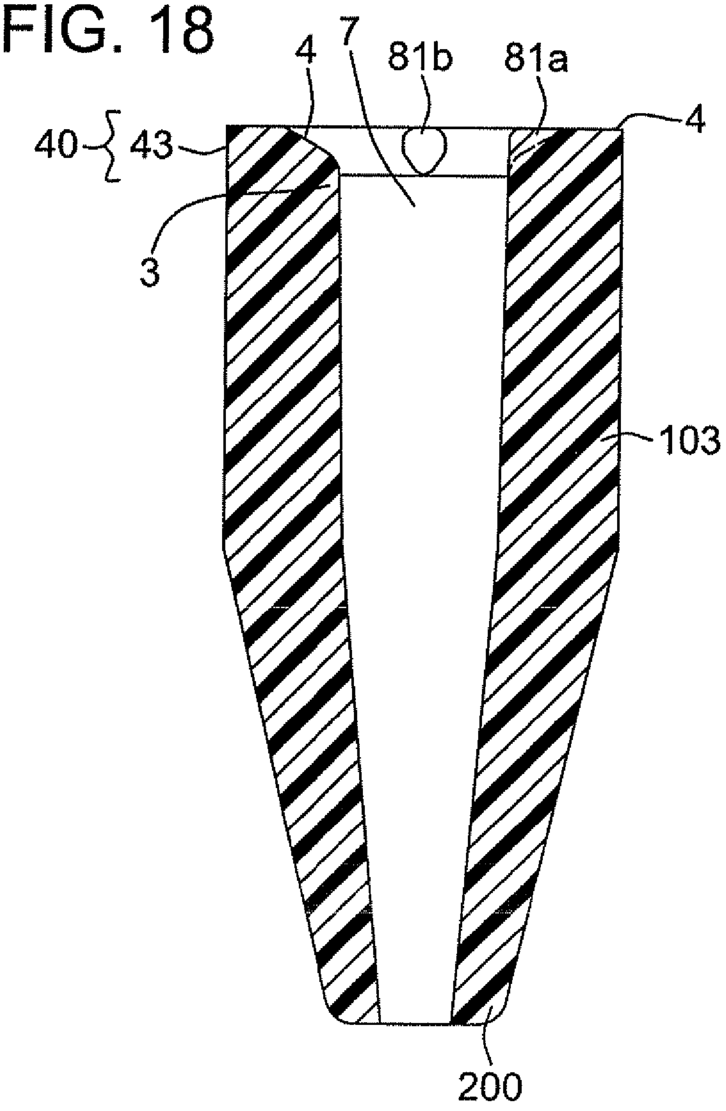
FIG. 18 shows a cut away view of the lower chamber of one of the wells shown in FIG. 16, showing the bottom end of the well, including a bottom wall, a fluid flow port, and a sealing ring.

In these embodiments, the rib arrangement typically becomes partially deformed when the seal is created in accordance with the invention. Since there is a range of achievable deformation while providing efficient sealing, the rib arrangement compensates for some variability in, for example, the filters and/or the plates (e.g., with respect to thickness and/or flatness) of the devices. Additionally, in those embodiments including a plurality of separate inserts (e.g., as shown in FIGS. 12 and 18), the use of separate inserts allows the seal to be optimized with respect to individual wells and/or a series of wells, that also compensates for variability in the filters and/or plates.

The sealing ring can be made of any suitable material that provides a desired property or combination of properties, such as, for example, resilience, chemical compatibility with the sample or reaction components, and cost. Exemplary materials include, but are not limited to, rubber, silicone, and thermoplastic materials such as, for example, polypropylene and polystyrene.

Figure 11:
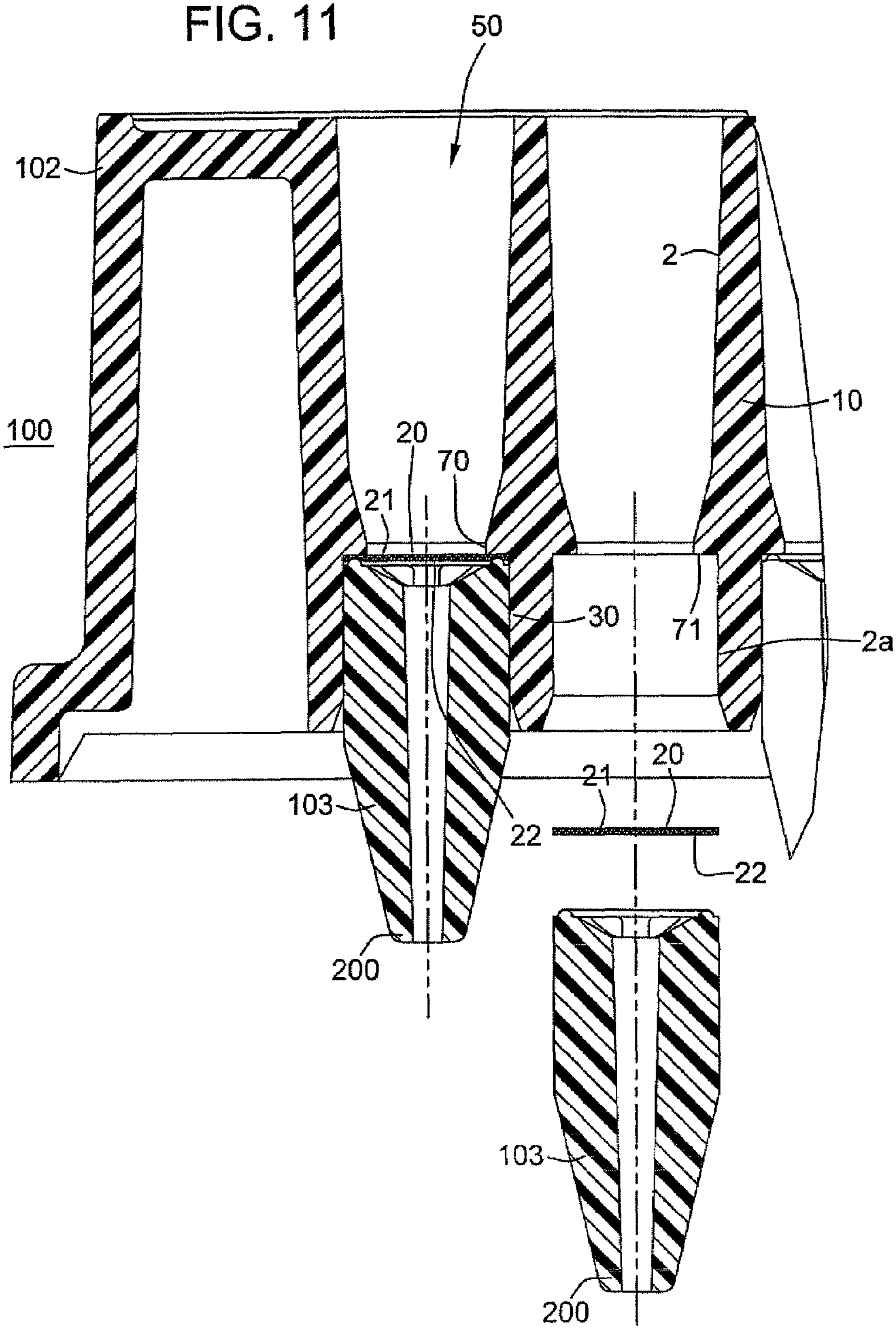
FIG. 11 shows a partial cross-sectional view of another embodiment of a multiple well device according to the invention, showing an assembled well and an exploded view of a well. The Figure shows a top plate including inwardly extending lips, wherein each lip has a bottom surface; and individual lower chambers, each chamber including the bottom end of a well, wherein each bottom end includes a bottom wall, a fluid flow port, and a sealing ring comprising a rib arrangement projecting upwardly from the bottom wall, wherein the sealing ring is retained such that the outer surface of the sealing ring presses against the inner surface of the side wall of the well, and the bottom surface of the lip presses against the upper surface of the filter while the top surface of the rib arrangement presses against the lower surface of the filter, so that the filter is sealed in the well.
Figure 16:
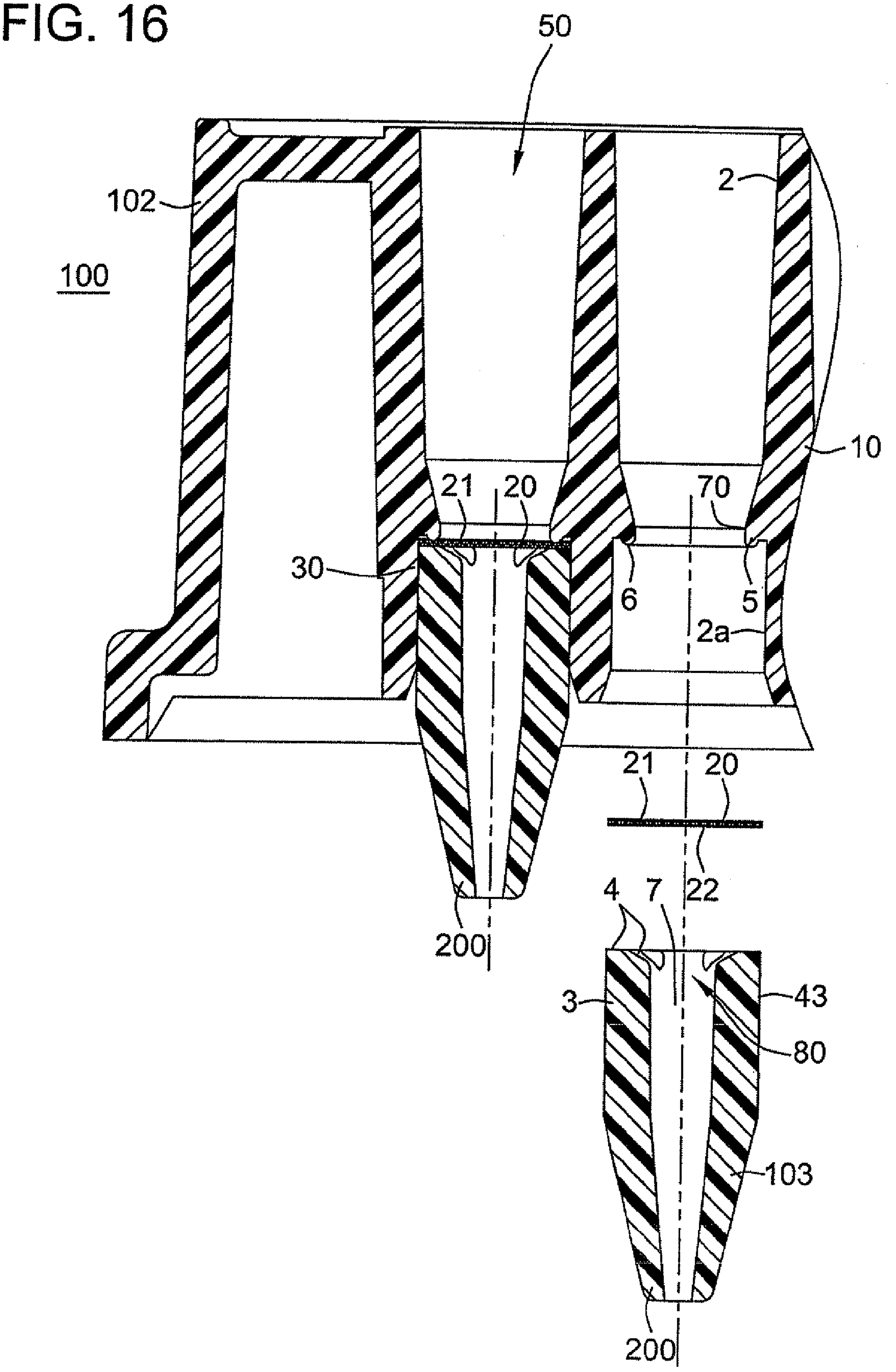
FIG. 16 shows a partial cross-sectional view of another embodiment of a multiple well device according to the invention, showing an assembled well and an exploded view of a well. The Figure shows a top plate including inwardly extending lips, wherein each lip has a rib arrangement projecting downwardly from the lip; and individual lower chambers, each chamber including the bottom end of a well, wherein each bottom end includes a bottom wall, a fluid flow port, and a sealing ring having an outer surface and a top surface, wherein the sealing ring is retained such that the outer surface of the sealing ring presses against the inner surface of the side wall of the well, and the bottom surface of the rib arrangement presses against the upper surface of the filter while the top surface of the sealing ring presses against the lower surface of the filter, so that the filter is sealed in the well.

As noted above, the device can have additional components. For example, the embodiment of the device illustrated in FIG. 5*b* includes an outlet 200 (e.g., forming a nozzle) communicating with fluid flow port 7. The outlet can have any suitable dimension and/or configuration. If desired, the outlet can be arranged to further reduce undesired liquid loss from the well caused by capillary action and/or gravity flow (sometimes referred to as "picking"). For example, the outlet can include a shoulder or collar preventing liquid from migrating upwardly along the outer diameter of the outlet. Alternatively, or additionally, the outlet can, for example, have any desired length. Illustratively, in the embodiment shown in FIG. 5*b*, the tip of the outlet does not extend to the bottom surface of plate 101. In other embodiments, e.g., as shown in FIGS. 6, 11, and 16, the tip of the outlet extends beyond the bottom surface of plate 101 (FIG. 6), or plate 102 (FIGS. 11 and 16). Typically, a longer outlet (e.g., as shown in FIGS. 6, 11 and 16) is desirable for those applications wherein the filtrate is to be analyzed, and the tip of the outlet will extend into a receiving plate during use. Alternatively, a shorter outlet (e.g., as shown in FIG. 5*b*) can be desirable for those applications wherein the retentive (the material retained in the well) is to be analyzed, as the tip of the outlet will not contact the surface of, for example, the lab bench when the plate 101 is placed on the lab bench. Thus, the potential for contamination of the work area and/or the filtrate can be reduced.

Figure 7:
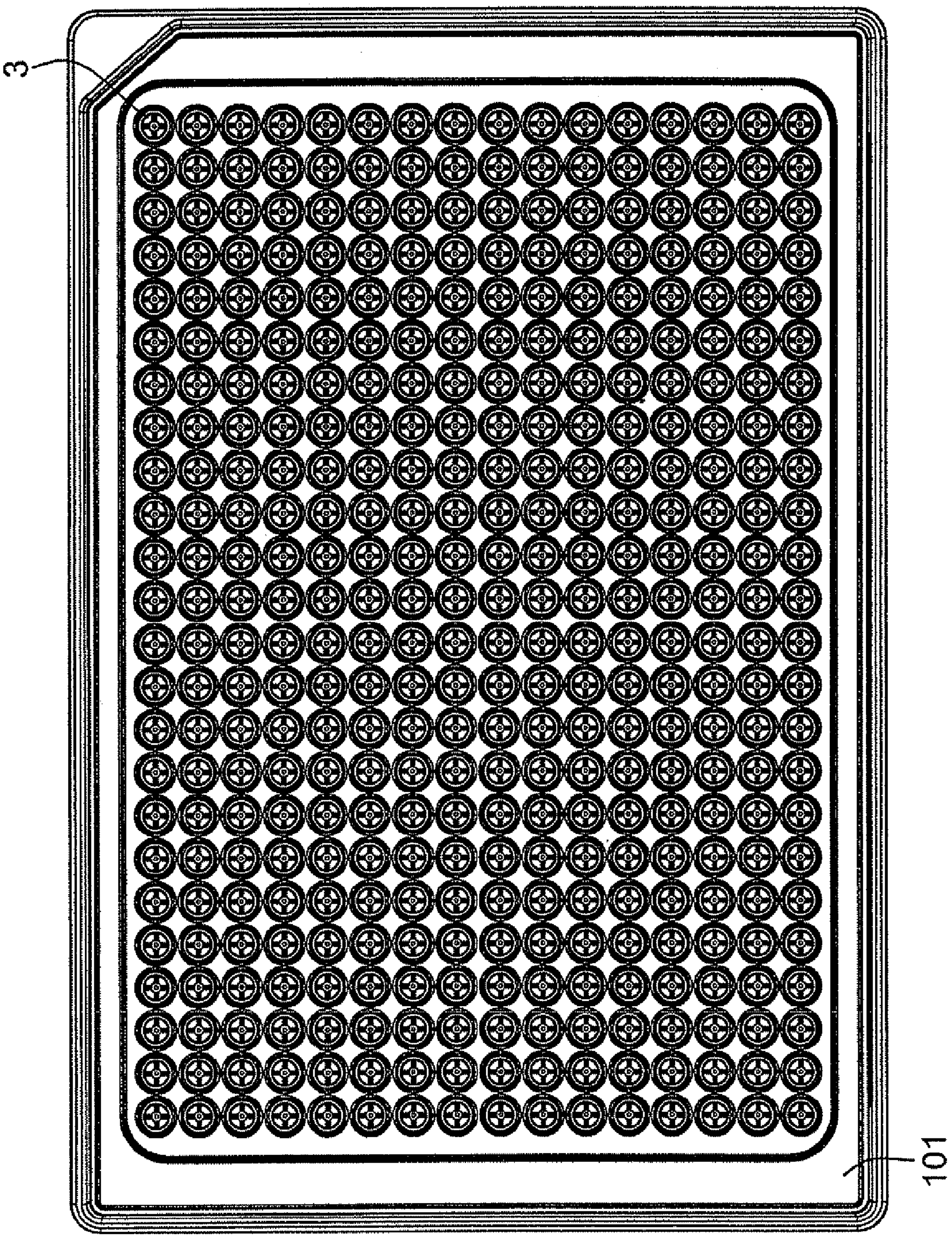
FIG. 7 shows a top view of the bottom plate shown in FIG. 6, showing the bottom ends of a plurality of wells, wherein each end includes a bottom wall, a fluid flow port, and a rib arrangement projecting upwardly from the bottom wall.
Figure 14:
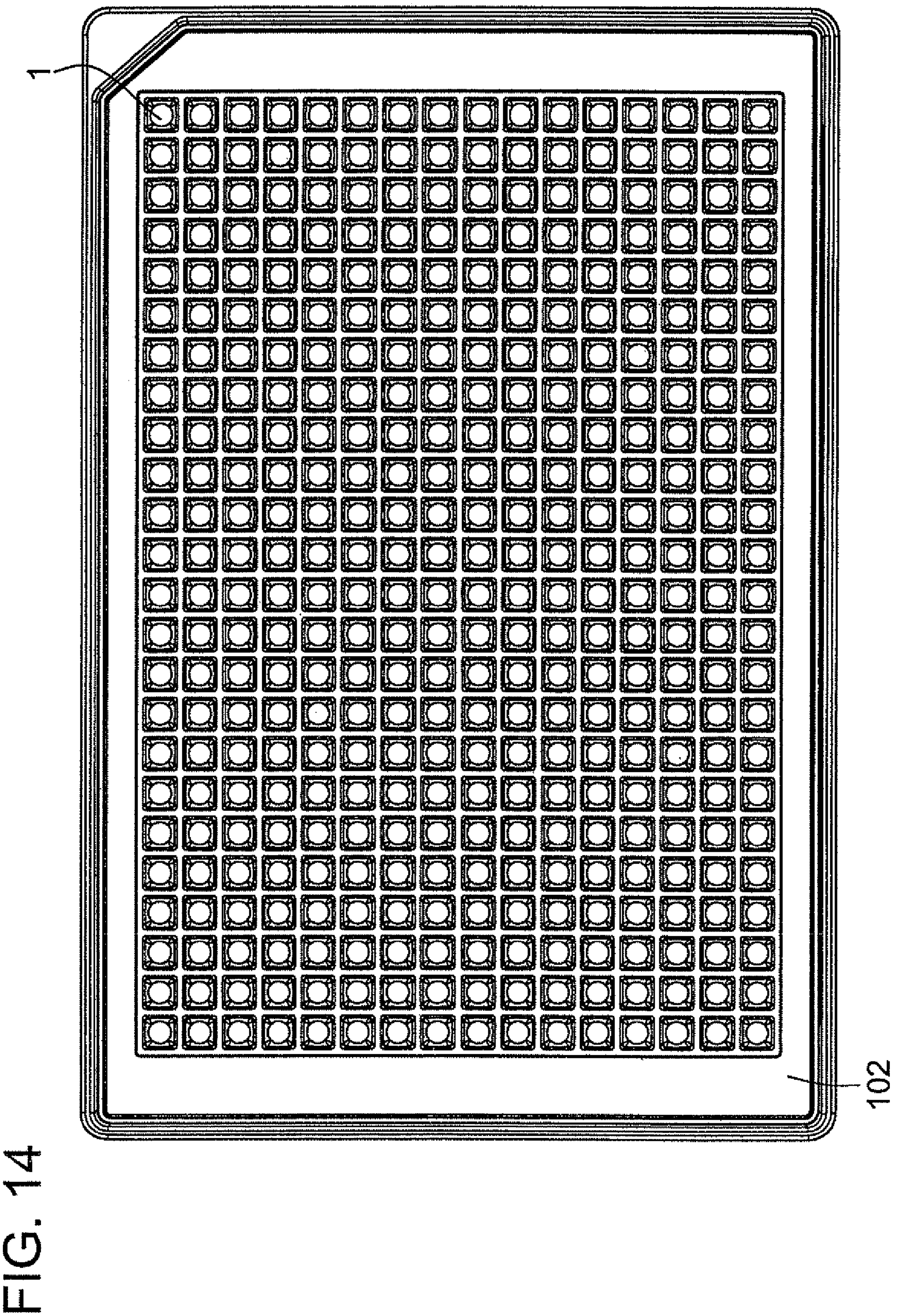
FIG. 14 shows a top view of the top plate shown in FIG. 11.

A plurality of wells can be connected together, e.g., in the form of a strip, disc, sheet, or tray. In preferred embodiments, a plurality of wells are connected together for use in devices according to the invention. For example, FIGS. 1, 7 and 14 show portions of embodiments of devices providing 96 well and 384 well devices. In another illustrative embodiment (not shown) a plurality of wells connected in the form of one or more strips can be attached (e.g., by a snap fit) to a support, frame, or plate. Alternatively, or additionally, e.g., in a variation of the embodiments shown in FIGS. 11 and 16, a plurality of inserts are connected together, for example, in the form of a strip, disc, sheet, or tray.

In some embodiments of the invention, especially some embodiments of multiple well devices according to the invention, the device comprises at least one plate or tray defining at least a part of the upper portion of the wells or at least a part of the lower portion of the wells (the plate or tray can comprise the sealing ring); a plurality of separate components (preferably inserts) defining at least a part of another portion of the well (e.g., a part of the lower portion wherein the plate or tray defines at least a part of the upper portion of the wells; and the separate insert can further comprise the sealing ring), and a filter compressed by the sealing ring. In other embodiments of multiple well devices, the device comprises at least a top plate and a bottom plate, and a filter. For example, the device can comprise an upper plate or tray defining the upper portion of the wells and/or the sealing ring, a bottom plate or tray defining at least the bottom wall of the wells, and a filter between the sealing ring and the bottom wall. Typically, the plates and/or separate components are snap-fit or press-fit together. In some embodiments, the plates and/or separate components are snap-fit or press-fit together and subsequently additionally bonded, e.g., via welding (such as ultrasonic welding), adhesives and/or solvents.

Figure 6:
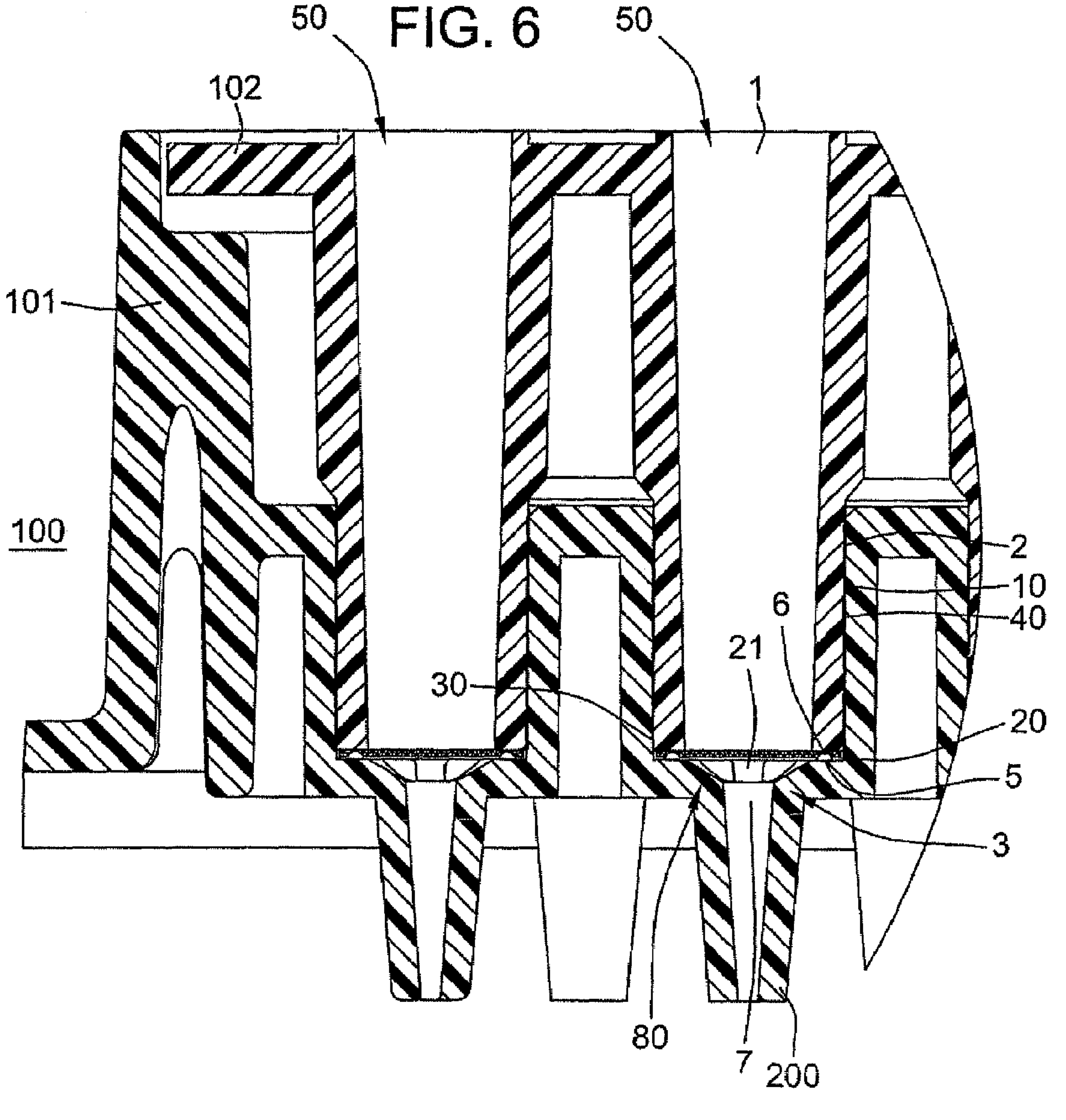
FIG. 6 shows a partial cross-sectional view of another embodiment of a multiple well device according to the invention, showing a top plate including a plurality of sealing rings, and a bottom plate including the bottom ends of a plurality of wells, wherein each end includes a bottom wall, a fluid flow port, and a rib arrangement projecting upwardly from the bottom wall, herein the sealing ring is retained such that the outer surface of the sealing ring presses against the inner surface of the side wall of the well, and the bottom surface of the ring presses against the upper surface of the filter while the top surface of the rib arrangement presses against the lower surface of the filter so that the filter is sealed in the well.

In accordance with the embodiment illustrated in partial cross-sectional view in FIG. 6, multiple well device 100 comprises a top plate 102 comprising sealing rings 40, a bottom plate 101 comprising bottom walls 4, and filters 20 each comprising at least one filter element 25, between the sealing rings and the bottom walls. The Figure shows two wells 50 (one well in exploded view), each well including a filter 20 comprising at least one filter element 25. The bottom plate 101 comprises (for each well) a side wall 10 having an inner surface 2, bottom end 3 comprising a bottom wall 4, a rib arrangement 5 and a fluid flow port 7, and a top plate 102 comprises (for each well) a sealing ring 40 having a bore 45. In the illustrated assembled well, the filter is compressed between the bottom surface 41 of the sealing ring and the top surface 6 of the rib arrangement.

As with the embodiment illustrated in FIGS. 1-5, the rib arrangement 5 illustrated in FIG. 6 has a top surface 6 (that is preferably a non-planar surface) disposed to contact the lower surface 22 of the filter 20 comprising at least one filter element 25. The top surface 6 of the rib arrangement does not contact the inner surface 2 of the side wall of the well, and the rib arrangement can be located a predetermined distance from the inner surface of the side wall.

In accordance with the embodiment illustrated in FIG. 6, wherein the top plate 102 comprises a sealing ring 40, the ring, having a bottom surface 41, and an outer surface 43, is retained against the inner surface of the hollow tubular wall, the outer surface 43 of the ring pressing against the inner surface 2 of the side wall (e.g., at location 30), and the lower surface 41 of the ring pressing against the upper surface 21 of the filter 20 while the top surface 6 of the rib arrangement 5 presses against the lower surface of the filter. In this embodiment, as with the embodiments illustrated in FIGS. 1-5, since the sealing ring 40 efficiently seals the filter 20 in the well, fluid is prevented from bypassing the filter.

Figure 8:
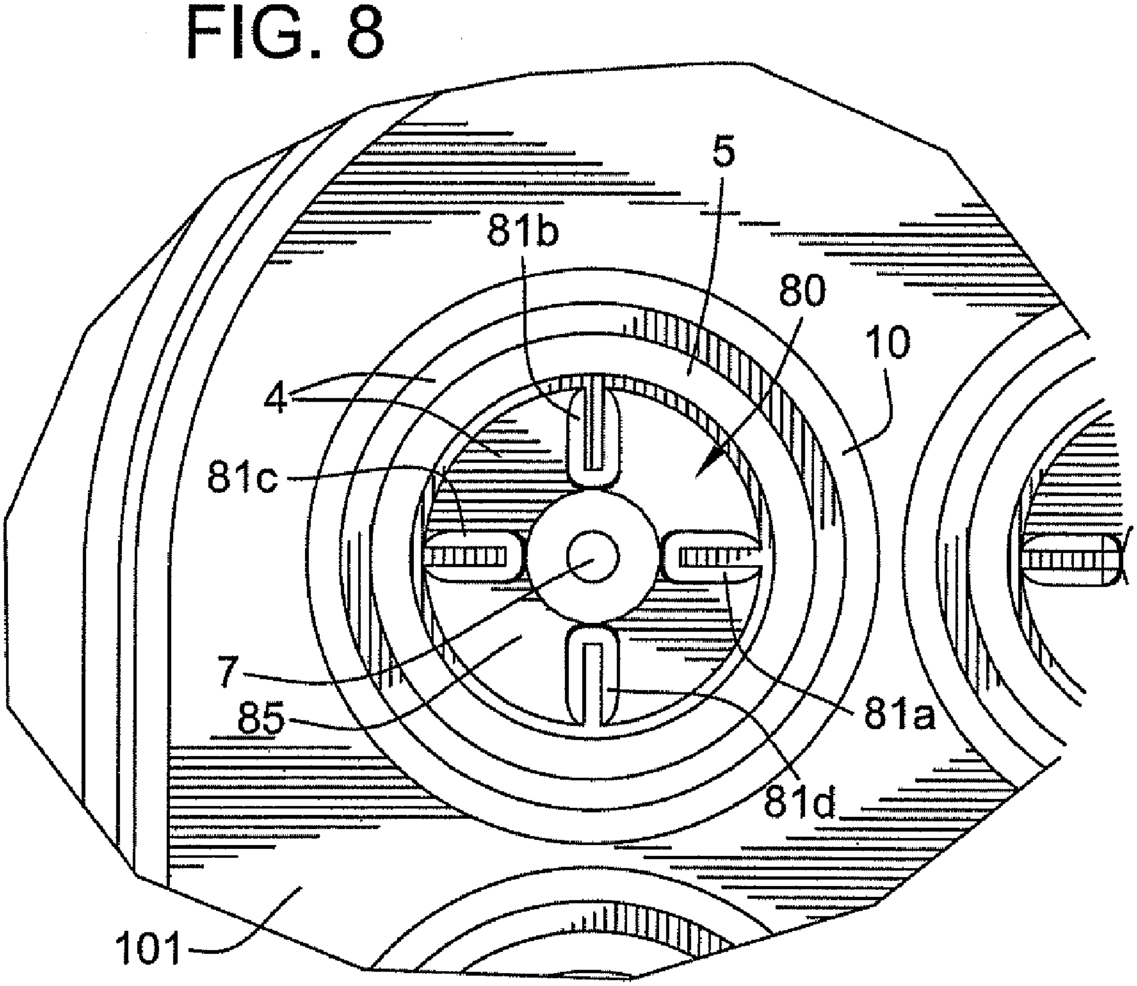
FIG. 8 shows a top view of the bottom plate including the bottom end of one of the wells shown in FIG. 6, showing a bottom wall, a rib arrangement, and a fluid flow port.

FIGS. 7-10 illustrate the individual components of the multiple well device 100 including the assembled well 50 shown in FIG. 6. Accordingly, FIG. 7 shows a top view of the bottom plate 101, showing the bottom ends of a plurality of wells, and FIG. 8 shows a top view of the bottom end of a well in more detail, wherein the end 3 includes a bottom wall 4, a rib arrangement 5 projecting upwardly from the bottom wall, a drainage grid 80 comprising a plurality of drainage grid spacers 81*a-d* projecting upwardly from the drainage grid wall 85 (a portion of bottom wall 4), and a fluid flow port 7. However, in other embodiments of the invention, the lower portion of the wells can have different arrangements, e.g., as shown in FIGS. 1 and 3, as well as FIGS. 13 and 17 (described below).

Figure 9:
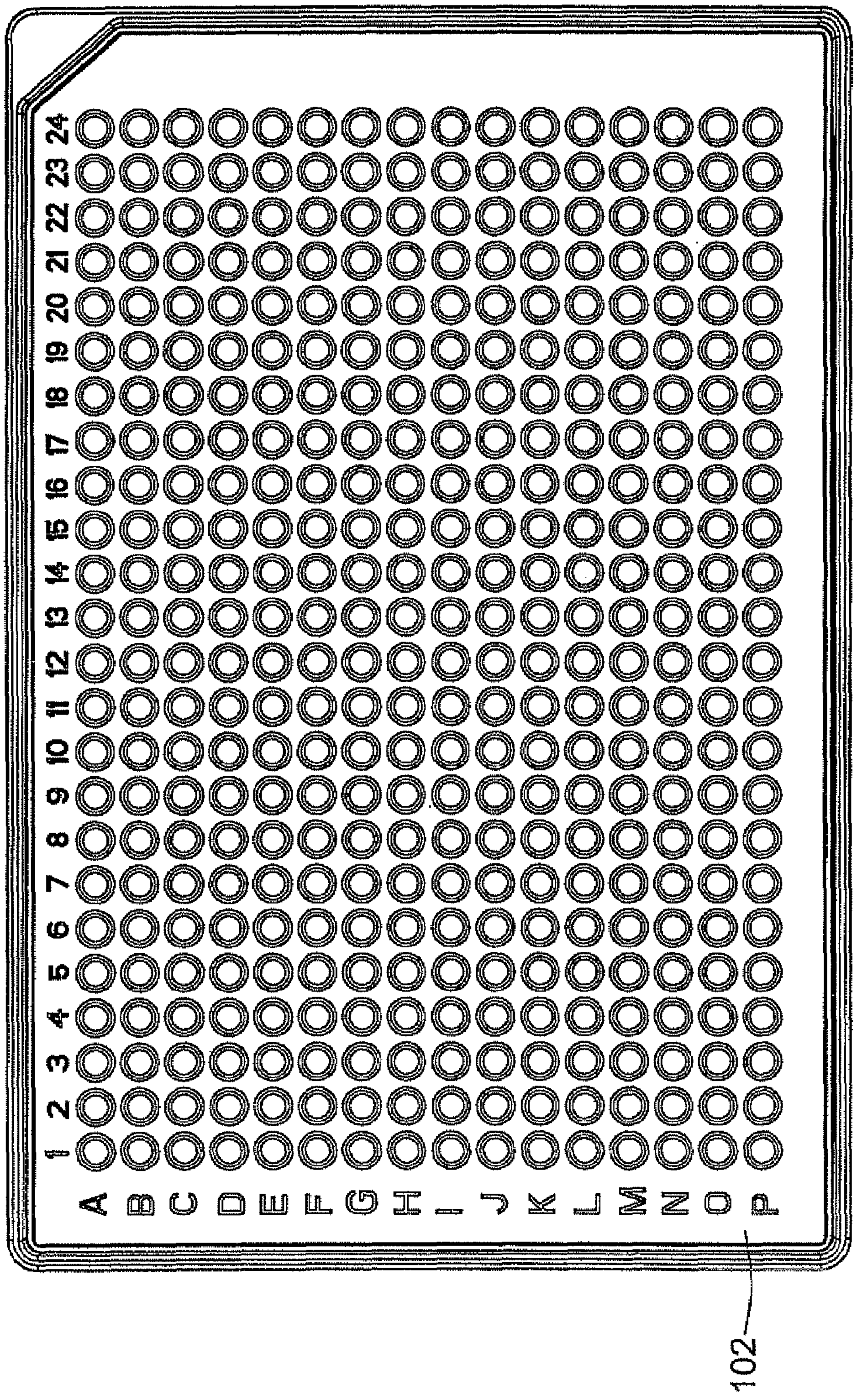
FIG. 9 shows a top view of the top plate shown in FIG. 6.
Figure 10A:
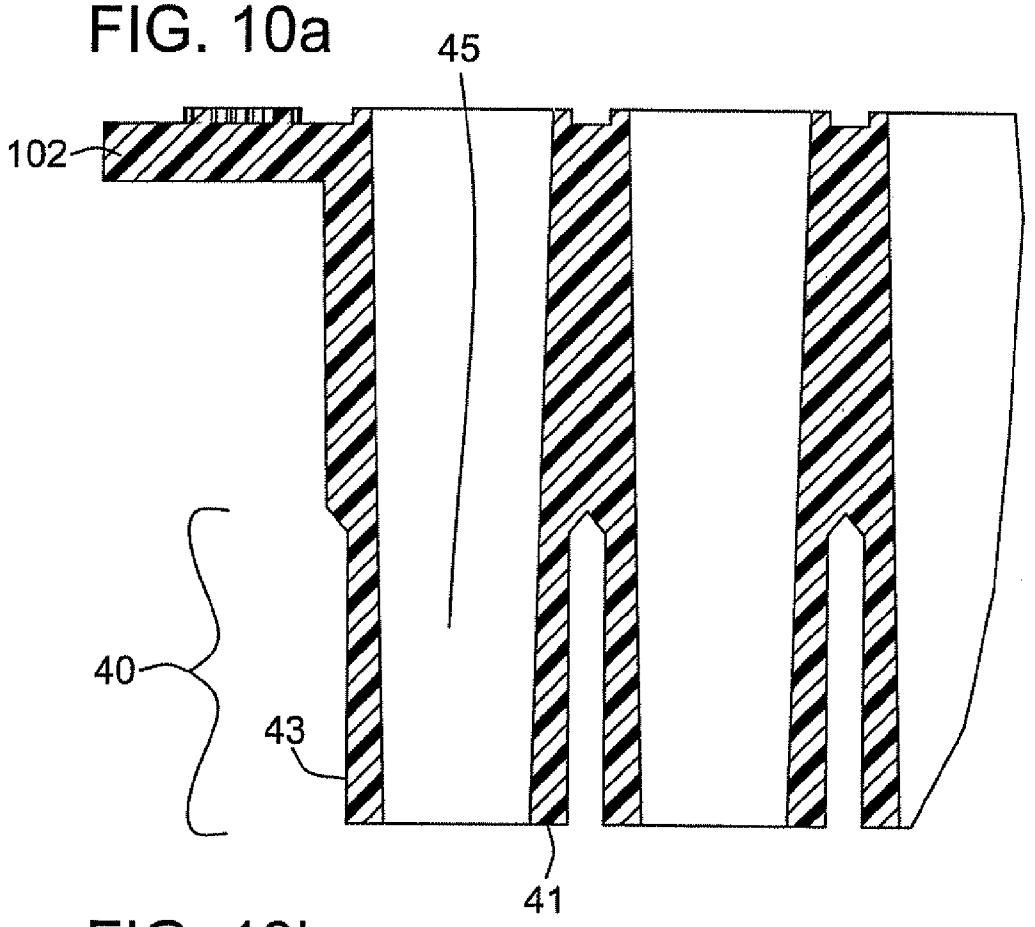
FIG. 10*a* shows a partial cross-sectional view of the top plate.
Figure 10B:
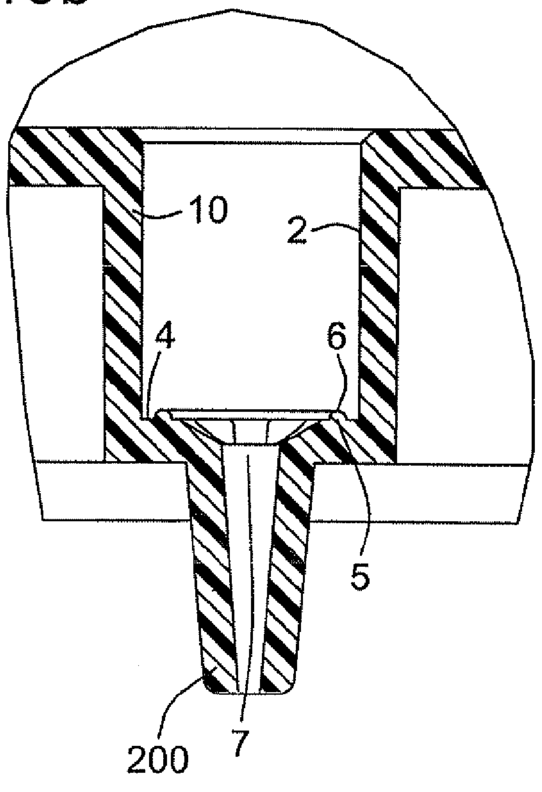
FIG. 10*b* shows a partial cross-sectional view of the bottom plate.

FIGS. 9 and 10*a* show, respectively, a top view, and a partial cross-sectional view of the top plate 102 shown in FIG. 6, and FIG. 10*b* shows a partial cross-sectional view of the bottom plate 101. As shown in more detail in FIG. 10*a*, top plate 102 comprises a sealing ring 40 having a bore 45, the ring having an outer surface 43 and a lower surface 41. The outer surface 43 of the ring presses against (as shown in FIG. 6) the inner surface 2 of the side wall of the tube 10 in the bottom plate 101.

In the embodiment illustrated in FIGS. 6 and 10*a*, the sealing ring 40 has a bore 45, and the bore extends to the top surface of the top plate. The bore is suitable for receiving fluid, and typically (using FIG. 6 for reference), fluid does not contact the inner surface 2 of the side wall 10. This is in contrast with, for example, the embodiments illustrated in FIGS. 5, 11 and 16, wherein fluid can contact the inner surface 2.

Embodiments of devices according to the invention can include a separate sealing ring (e.g., as shown in FIG. 5), or a sealing ring as part of an upper portion of the device (e.g., top plate 102 as shown in FIGS. 6 and 10*a*), or a sealing ring as part of the lower portion of the device, e.g., as part of the inserts described with respect to FIGS. 11 and 16 below.

In accordance with the embodiment illustrated in partial cross-sectional view in FIG. 11 (showing an assembled well and an exploded view of a well), multiple well device 100 comprises a top plate 102 having a plurality of wells 50, each well comprising a side wall 10 having an inner surface 2, an inwardly extending lip 70 having a lower surface 71 (the lip, typically an annular member, e.g., a ledge or flange, and the side wall, can be injection molded as a unitary piece); and a bottom chamber 103 (preferably a separate insert, typically forming a nozzle) comprising a bottom end 3 comprising a bottom wall 4, the bottom end also comprising a sealing ring 40 comprising a rib arrangement 5 having a top surface 6 projecting upwardly from the bottom wall, a grid arrangement 80, and a fluid flow port 7; and a filter 20 comprising at least one filter element 25, compressed between the top surface 6 of the rib arrangement 5 (the top surface of the sealing ring) and the lower surface 71 of the lip.

In the embodiment illustrated in FIG. 11, the sealing ring 40 comprises an outer surface 43, and the rib arrangement 5 wherein the top surface 6 of the rib arrangement provides the top surface of the sealing ring. The top surface 6 (that is preferably a non-planar surface) is disposed to contact the lower surface 22 of the filter 20 comprising at least one filter element 25. Typically, the top surface 6 of the rib arrangement does not contact the inner surface 2 of the side wall of the well, and the rib arrangement can be located a predetermined distance from the inner surface of the side wall, e.g., a predetermined distance from that portion of the inner surface (portion 2*a* of inner surface 2) below the lower surface 71 of lip 70. Preferably, the top surface of the rib arrangement has a radial width that is at least the radial width of the lower surface of the lip.

In sealing the filter in the device illustrated in FIG. 11, the outer surface 43 of the sealing ring presses against the inner surface 2 of the side wall, and the lower surface of the lip presses against a portion of the upper surface 21 of the filter 20 (e.g., at least the portion of the upper surface 21 opposite the portion of the lower surface of the filter contacting the top of the rib arrangement) while the top surface 6 of the rib arrangement 5 presses against the lower surface 22 of the filter. As with the other embodiments, fluid is prevented from bypassing the filter.

Figure 15:
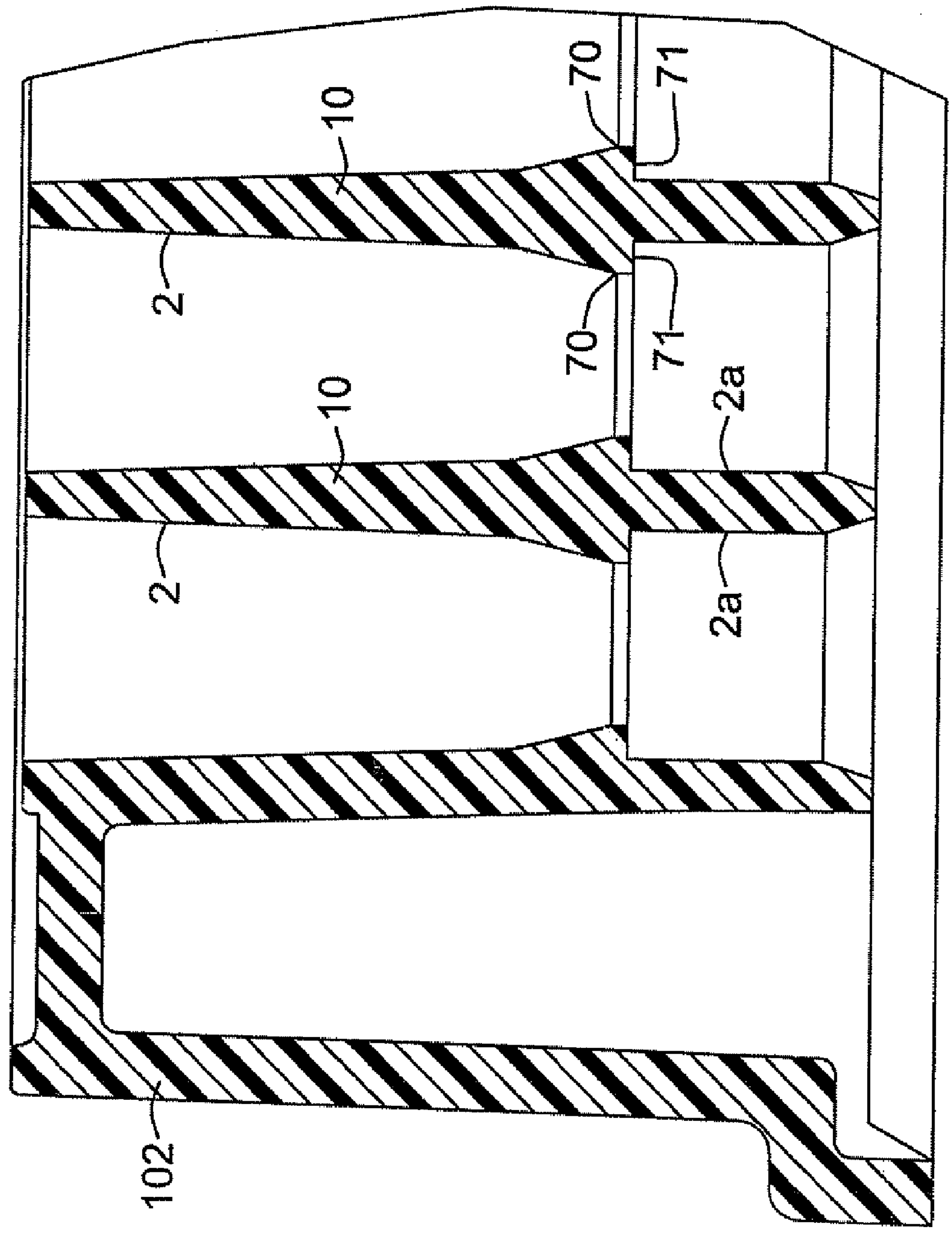
FIG. 15 shows a partial cross-sectional view of the top plate shown in FIG. 14.

FIGS. 12-15 illustrate the individual components of the multiple well device 100 shown in FIG. 11. Accordingly, FIGS. 12 (partial cut away view) and 13 (top view) show the bottom chamber 103, comprising the bottom end 3 including a bottom wall 4, sealing ring 40 comprising an outer surface 43 and a rib arrangement 5 projecting upwardly from the bottom wall, a drainage grid 80 comprising a plurality of drainage grid spacers 81*a-d* projecting upwardly from the bottom wall 4, and a fluid flow port 7. FIGS. 14 and 15 show, respectively, a top view, and a partial cross-sectional view of the top plate 102 shown in FIG. 11.

Figure 17:
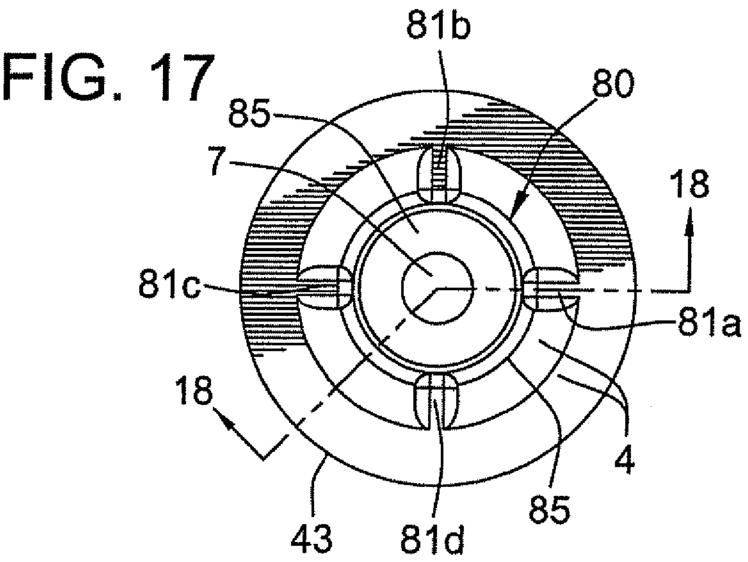
FIG. 17 shows a top view of the bottom end of the well shown in FIG. 16, showing a bottom wall, a drainage grid, and a fluid flow port
Figure 19:
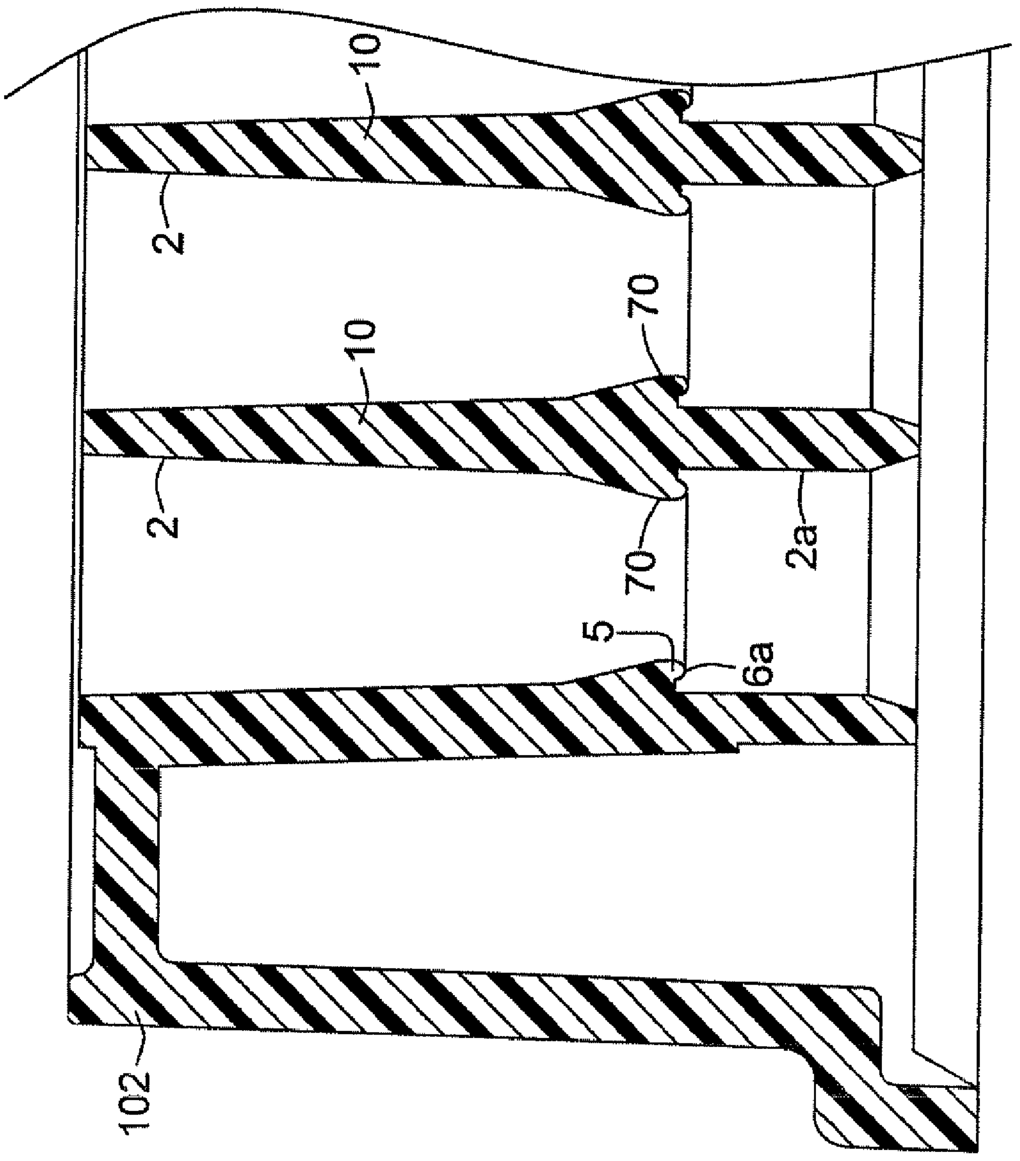
FIG. 19 shows a partial cross-sectional view of the top plate shown in FIG. 16.

FIG. 16 shows a partial cross-sectional view of another embodiment of a multiple well device according to the invention (showing an assembled well and an exploded view of a well), and FIGS. 17-19 illustrate individual components of this embodiment of the device in more detail.

FIG. 16 shows multiple well device 100 comprising a top plate 102 having a plurality of wells 50, each well comprising a side wall 10 having an inner surface 2, an inwardly extending lip 70 comprising a rib arrangement 5 projecting downwardly from the lip, the lip having a bottom surface 6*a*, preferably spaced away from the inner surface 2 of the side wall. The lip and side wall can be injection molded as a unitary piece. FIG. 16 also shows a bottom chamber 103 (preferably a separate insert, more typically forming a nozzle) comprising a bottom end 3 comprising a bottom wall 4, the bottom end also comprising a grid arrangement 80, and a fluid flow port 7, and a sealing ring 40 comprising an outer surface 43 and a top surface, wherein the bottom wall of the bottom end comprises the top surface of the sealing ring, and a filter 20 comprising at least one filter element 25, compressed between the bottom surface 6*a* of the rib arrangement 5 and the top surface of the sealing ring.

FIGS. 17-19 illustrate the individual components of the multiple well device 100 shown in FIG. 16. Accordingly, FIGS. 17 (top view) and 18 (partial cut away view) show the bottom chamber 103, comprising the bottom end 3 including a bottom wall 4, sealing ring 40 comprising an outer surface 43 and a top surface, wherein the bottom wall of the bottom end comprises the top surface of the sealing ring, a drainage grid 80 comprising a plurality of drainage grid spacers 81*a-d* projecting upwardly from the bottom wall 4, and a fluid flow port 7. FIG. 19 shows a partial cross-sectional view of the top plate 102 shown in FIG. 16, including side wall 10 having an inner surface 2, an inwardly extending lip 70 comprising a rib arrangement 5 projecting downwardly from the lip, the lip having a bottom surface 6*a*. In this illustrated embodiment, the bottom surface 6*a* is spaced away from the inner surface 2 of the side wall (e.g., the Figure shows a depression between the bottom surface 6*a* and portion 2*a* of inner surface 2). Preferably, the bottom surface 6*a* of the rib arrangement has a radial width that is at least the radial width of the top surface of the sealing ring.

In sealing the filter in the device shown in FIG. 16, the outer surface 43 of the sealing ring presses against the inner surface 2 of the side wall 10 (at portion 2*a*), and the bottom surface 6*a* of the rib arrangement 5 presses against a portion of the upper surface 21 of the filter 20 while the top surface of the sealing ring presses against the lower surface 22 of the filter. As with the other embodiments, fluid is prevented from bypassing the filter.

In a variation of the embodiment illustrated in FIGS. 17-19, the inwardly extending lip does not include a rib arrangement projecting downwardly from the lip. For example, the lip can have a lower surface, and the lower surface presses against a portion of the upper surface of the filter while the top surface of the sealing ring presses against the lower surface of the filter.

As described above with respect to embodiments of the invention, the sealing ring 40 is preferably frictionally engaged against the inner wall of the well, while providing for sealing the filter in the well without requiring the use of welding and/or adhesives to retain the ring in the well. For example, using the embodiments illustrated in FIGS. 5*b* and 6 for reference, the sealing ring is frictionally engaged against the wall at location 30, with the bottom surface 41 of the ring pressing against the upper surface 21 of the filter 20, and the peripheral portion of the lower surface 22 of the filter 20 pressing against the top surface 6 of the rib arrangement 5. The sealing ring can also be frictionally engaged against the wall at position 30 as shown in the embodiments illustrated in FIGS. 11 and 16. If desired, position 30 can be predetermined, e.g., by adjusting the thickness and/or density of the filter elements. Alternatively, or additionally, the position can be predetermined by controlling the force applied to introduce the sealing ring into the hollow tube (FIG. 5) or the force applied to introduce the inserts into the trays (e.g., introducing the inserts comprising sealing rings into the top plates using FIGS. 11 and 16 for reference). The frictional engagement is preferably accomplished by adjusting the relative sizes of the outer diameter of the sealing ring and the inner diameter of the well.

A variety of materials are suitable for producing rib arrangements, lips, drainage grids, inserts, chambers, plates, and sealing rings according to the invention. Illustrative materials include, for example, polyvinyl chloride with or without copolymers, polyethylenes, polystyrenes, polystyrene-acrylonitrile, polypropylene, polyvinylidene chloride, and the like.

The wells and multiple well devices according to the invention can have any suitable overall dimension and capacity, although preferred embodiments have substantially the same overall dimension and capacity of standard wells and devices. Such embodiments are preferred as being more easily utilized with devices and instruments, such as liquid handling systems and readers, that are commonly available for use with conventional wells and devices. In those applications wherein a signal is generated, e.g., in the course of a microtitration assay, the signal can be read by any suitable means, e.g., by visual analysis, or the detection of a fluoro metric, spectrophotometric, radio metric, or chemiluminescent signal.

Typically, each well is suitable for receiving at least about 200 microliters (μL), more typically, at least about 350 μL, of fluid to be processed. In some embodiments, each well is suitable for receiving at least about 800 μL of fluid, or at least about 1 mL, or at least about 2 mL of fluid, or more.

If desired, the well, more typically, a multiple well device, is chemically resistant, and can be used with harsh solvents and/or harsh chemicals.

The present invention is useful in a variety of applications including microtitration, microchromatography, radiography, microfiltration, ultrafiltration, nanofiltration, washing processes, polymerase chain reaction (PCR) analysis, high throughput, especially high throughput screening (HTS), combinatorial chemistry, nucleic acid and protein processing (including synthesis, sequencing, separation and/or purification) and microculture of cell suspensions and tissues. The invention can be used in any suitable setting, including, but not limited to, hospitals and laboratories. Embodiments of the invention are suitable for a variety of protocols, including sample preparation, clinical diagnostic assays, and screening specimens, e.g., drugs in pharmaceutical research. If desired, materials (e.g., ligands, nucleic acids) can be bound to solid phase particles such as beads and collected in the wells, and the materials can be cleaved from the particles such that the materials are collected in the filtrate. In some embodiments, the cleaved materials (e.g., ligands and synthesized nucleic acids) can be further processed (e.g., screened) using another well, e.g., the filtrate can be passed into one or more multiple well devices. Alternatively, or additionally, the invention can be compatible with other subsequent processes including, but not limited to, at least one of dot blotting, immunoblotting, receptor binding assays, ELISA, and RIA.

Embodiments of the invention are especially suitable for removing particulates from a fluid, e.g., to provide a filtered sample for analysis, for example, by high pressure liquid chromatography (HPLC), gas chromatography (GC), mass spectrometry (MS), infra red (IR), nuclear magnetic resonance (NMR), and solid-phase extraction.

Accordingly, a variety of filters and filter elements (as used herein, the terms “filter” and “filter element” refer to porous media used in these various applications) are suitable for use in the invention, and those skilled in the art will recognize that the choice of filter(s) and filter clement(s) will depend on the intended use of the well. The filter can comprise a depth filter and/or a sieve filter. The filter can include fibrous and/or membrane filter elements. The filter can include additional elements and/or components such as, for example, at least one of a drainage, cushion, and prefilter layer. Typical filter elements include membranes, especially polymeric membranes. For some applications, the filter elements are chemically resistant, and can be used with harsh solvents and/or harsh chemicals. In some embodiments, the filter comprises a plurality of filter elements, and the elements can have different characteristics, e.g., at least one of pore size, chemistry (for example, at least one of critical wetting surface tension, surface charge, polarity, hydrophilicity, and attached functional groups), and can include different reagents and assay components.

Filters and filter elements of suitable shape for use in the invention are typically stamped or otherwise cut out of sheets of suitable material(s), e.g., membrane sheets.

A filter element such as a porous membrane or a fibrous element can have any suitable pore structure such as a pore size, or a pore rating or a pore diameter. Thus, e.g., a filter element comprising a membrane typically has an average pore size of about 100 μm or less, preferably from about 0.01 μm to about 100 μm. In some embodiments, the membrane has an average pore size of about 0.1 μm or less, or from about 0.1 μm to about 10 μm. Preferably, the membrane has an average pore size of about 5 μm or less.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Of course, variations of those preferred embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A well for use in processing a fluid comprising:

a hollow tube having an axis, the tube comprising a side wall having an inner surface and a lip extending inwardly from said side wall, the lip comprising a rib arrangement projecting downwardly from the lip, the rib arrangement having a bottom surface;

upper and lower axially spaced ends;

the lower end comprising a chamber comprising a bottom wall and a fluid flow port and a sealing ring, the sealing ring comprising an outer surface and a top surface, the outer surface of the sealing ring pressing against the inner surface of the side wall of the tube;

a filter comprising at least one filter element comprising a membrane, the filter having an upper surface and a lower surface, the filter being compressed between the top surface of the sealing ring and the bottom surface of the rib arrangement.

2. The well of claim 1, wherein the bottom surface of the rib arrangement is spaced from the inner surface of the side wall.

3. The well of claim 1, wherein the lower end comprises an insert.

4. The well of claim 1, wherein the filter further comprises a fibrous medium.

5. The well of claim 1, wherein the filter comprises at least two filter elements.

6. The well of claim 1, wherein the lower end includes a drainage grid.

7. A multiple well device comprising:

a plurality of wells, each well comprising upper and lower axially spaced ends and a hollow tube having an axis, the tube comprising a side wall having an inner surface and a lip extending inwardly from said side wall, the lip comprising a rib arrangement projecting downwardly from the lip, the rib arrangement having a bottom surface;

the lower end of each well comprising a chamber comprising a bottom wall and a fluid flow port and a sealing ring, the sealing ring comprising an outer surface and a top surface, the outer surface of the sealing ring pressing against the inner surface of the side wall of the tube;

a filter in each well, each filter having an upper surface and a lower surface and comprising at least one filter element, wherein each filter is compressed between the top surface of the sealing ring and the bottom surface of the rib arrangement.

8. The multiple well device of claim 7, wherein the bottom surface of each rib arrangement is spaced from the inner surface of each side wall.

9. The multiple well device of claim 7, wherein each lower end comprises an insert.

10. The multiple well device of claim 7, wherein each filter comprises a membrane.

11. The multiple well device of claim 10, wherein the membrane comprises an ultrafiltration membrane.

12. The multiple well device of claim 7, wherein each filter comprises a fibrous medium.

13. The multiple well device of claim 7, wherein each filter comprises at least two filter elements.

14. The multiple well device of claim 7, wherein the each lower end includes a drainage grid.

15. The multiple Well device of claim 7, comprising 96 wells.

16. The multiple well device of claim 7, comprising 384 wells.

17. A method for processing a fluid comprising:

passing fluid into a plurality of wells, each well comprising a side wall having an inner surface and a lip extending inwardly from said side wall, the lip comprising a rib arrangement projecting downwardly from the lip, the rib arrangement having a bottom surface; and a lower end comprising a chamber comprising a bottom wall and a fluid flow port and a sealing ring, the sealing ring comprising a top surface; the well having a filter comprising at least one filter element sealed therein, the filter being compressed between the top surface of the sealing ring and the bottom surface of the rib arrangement; and passing at least a portion of fluid through the filter in each well and through the fluid flow port at the bottom end of each well.

18. The method of claim 17, wherein the passing the fluid through the filter includes depleting the fluid of particulates.

19. The method of claim 17, further comprising analyzing the fluid passing through the filter.

20. The method of claim 17, wherein passing at least a portion of the fluid through the filter comprises passing fluid through a membrane.

21. The method of claim 17, wherein passing at least a portion of the fluid through the filter comprises passing fluid through a fibrous medium.

22. A well for use in processing a fluid comprising:

a hollow tube having an axis, the tube comprising a side wall having an inner surface and a lip extending inwardly from said side wall, the lip comprising a rib arrangement projecting downwardly from the lip, the rib arrangement having a bottom surface;

upper and lower axially spaced ends;

the lower end comprising a chamber comprising a bottom wall and a fluid flow port and a sealing ring, the sealing ring comprising an outer surface and a top surface, the outer surface of the sealing ring pressing against the inner surface of the side wall of the tube;

a filter comprising at least one filter element comprising a fibrous medium, the filter having an upper surface and a lower surface, the filter being compressed between the top surface of the sealing ring and the bottom surface of the rib arrangement.

23. The well of claim 22, wherein the bottom surface of the rib arrangement is spaced from the inner surface of the side wall.

* * * * *